(12) United States Patent
Hogan et al.

(10) Patent No.: US 11,312,583 B2
(45) Date of Patent: Apr. 26, 2022

(54) ADAPTIVE JOINT CONNECTOR SYSTEM AND METHOD FOR CONNECTING CONVEYOR TRACK

(71) Applicant: ATS AUTOMATION TOOLING SYSTEMS INC., Cambridge (CA)

(72) Inventors: Roger Hogan, Cambridge (CA); Clayton Ditzend, Cambridge (CA); Steve Aikens, Cambridge (CA); Albert Kleinikkink, Cambridge (CA)

( * ) Notice: Subject to any disclaimer, the term of this patent is extended or adjusted under 35 U.S.C. 154(b) by 0 days.

(21) Appl. No.: 16/944,912

(22) Filed: Jul. 31, 2020

(65) Prior Publication Data
US 2021/0032039 A1   Feb. 4, 2021

Related U.S. Application Data

(60) Provisional application No. 62/881,082, filed on Jul. 31, 2019.

(51) Int. Cl.
*B65G 54/02* (2006.01)
*B65G 35/00* (2006.01)

(52) U.S. Cl.
CPC .......... *B65G 54/02* (2013.01); *B65G 35/00* (2013.01); *B65G 2207/30* (2013.01)

(58) Field of Classification Search
CPC ..... B65G 54/02; B65G 2207/30; B65G 35/00
See application file for complete search history.

(56) References Cited

U.S. PATENT DOCUMENTS

| | | | | |
|---|---|---|---|---|
| 5,598,784 A | * | 2/1997 | Kubsik | B65G 21/06 104/111 |
| 5,768,966 A | | 6/1998 | Duginske | |
| 5,957,057 A | * | 9/1999 | Nakamura | E01B 25/24 104/111 |
| 8,397,896 B2 | * | 3/2013 | Kleinikkink | B65G 54/02 198/345.3 |
| 9,067,739 B2 | | 6/2015 | Van De | |
| 9,333,875 B2 | * | 5/2016 | Staunton | B60L 13/03 |
| 9,923,444 B2 | * | 3/2018 | Kleinikkink | H02K 15/065 |
| 10,759,607 B2 | * | 9/2020 | Mukai | H02K 41/02 |
| 2013/0164078 A1 | | 6/2013 | Spies et al. | |

(Continued)

FOREIGN PATENT DOCUMENTS

| | | | | |
|---|---|---|---|---|
| EP | 3462573 A2 | 4/2019 | | |
| WO | WO-2018055721 A | * 3/2018 | | B25J 19/00 |

OTHER PUBLICATIONS

European Patent Office, European Search Report for Corresponding EP Pat. App No. 20188740.3, dated Dec. 1, 2020.

*Primary Examiner* — Mark A Deuble
(74) *Attorney, Agent, or Firm* — Amarok IP Inc.; Neil W. Henderson

(57) ABSTRACT

A joint connector for track sections of a conveyor wherein the track sections comprise a feature that requires alignment, the joint connector including: a first segment for attachment to an attachment feature of a first track section of the conveyor; and a second segment for attachment to an attachment feature of a second track section of the conveyor, wherein the second segment is configured to be adaptive to non-alignment of the attachment features of the first and second track sections in order to maintain alignment of the feature after installation of the joint connector.

15 Claims, 25 Drawing Sheets

(56) References Cited

U.S. PATENT DOCUMENTS

2015/0008768 A1* 1/2015 Achterberg ............ B65G 54/02
                                              310/12.11
2019/0202639 A1   7/2019 Mukai et al.
2020/0010287 A1* 1/2020 Urata .................... B65G 54/02

* cited by examiner

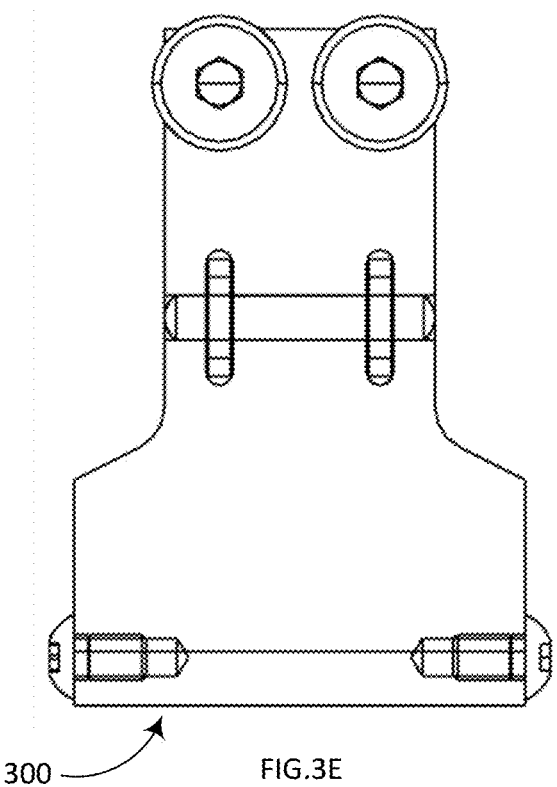
300  FIG.3E
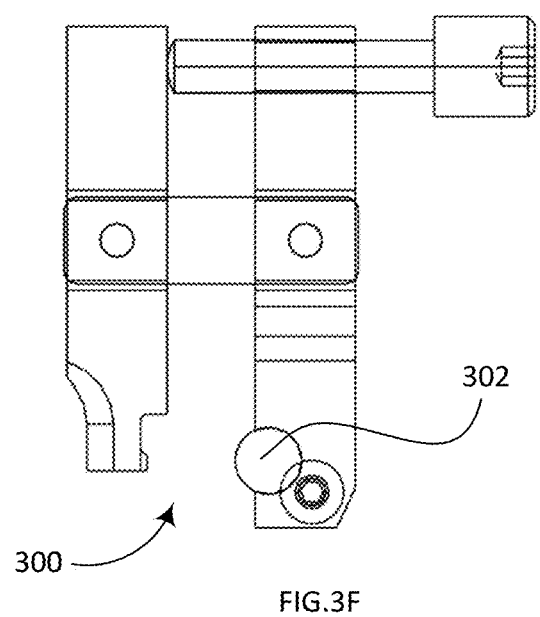
302
300  FIG.3F

ADAPTIVE JOINT CONNECTOR SYSTEM AND METHOD FOR CONNECTING CONVEYOR TRACK

RELATED APPLICATIONS

The present disclosure claims priority to U.S. Patent Application No. 62/881,082, which is hereby incorporated by reference.

FIELD

The present disclosure relates generally to an adaptive joint connector and, more particularly, to an adaptive joint connector for a conveyor system and a method for connecting conveyor track sections.

BACKGROUND

In conventional conveyor systems, a moving element is controlled to move along a track, typically via bearings that are provided on the moving element. In order to make a conveyor system easier to construct, the track is often formed in sections and the sections are attached together to form a longer track. The alignment of the track sections can be important to reduce or eliminate jarring or noise as a moving element/bearings move along the track. The alignment can also be important in reducing/preventing wear on the bearings and/or wheels and track that may be caused by misalignment.

A linear motor conveyor system is one in which a moving element is moved by electromotive force. For example, the moving element may include a magnet and the track may include an electromagnetic field generator. The moving element is placed on the track such that the magnet is acted on by the electromagnetic field in order to generate an electromotive force and move the moving element along the track.

In linear motor conveyor systems, forces, including forces causing acceleration, on the moving element can be high in order to move or stop the moving element quickly in order to increase production speeds. When the moving element is moving quickly along a track, it is even more important for adjacent track sections to be connected in a way that maintains alignment between the bearing surfaces of the track sections. In particular, it is can also be important to allow for tolerance errors introduced during manufacturing of the track sections in order to ensure a smooth ride.

Linear motor conveyor systems are becoming more popular on assembly lines and, as such, are being produced in larger quantities with somewhat reduced tolerances in the making of the parts, such as track sections. This can lead to issues with maintenance and control if moving elements/bearings encounter a misalignment when traversing from one track section to another. Similar issues apply with regard to various kinds of conveyors, if alignment of track sections can be improved, there will generally be a reduction in noise, wear, vibration, and the like.

As such, there is a need for an improved system and method of connecting conveyor track sections.

SUMMARY

According to one aspect herein, there is provided a joint connector for track sections of a conveyor wherein the track sections comprise a feature that requires alignment, the joint connector including: a first segment for attachment to an attachment feature of a first track section of the conveyor; and a second segment for attachment to an attachment feature of a second track section of the conveyor, wherein the second segment is configured to be adaptive to non-alignment of the attachment features of the first and second track sections in order to maintain alignment of the feature after installation of the joint connector.

In some cases, the second segment may be configured to be adaptive in order to maintain an alignment tolerance of the feature of 100 microns or less, 50 microns or less, 40 microns or less, or 25 microns or less.

In some cases, the second segment may be configured to be adaptive in at least one of a vertical direction and a horizontal direction.

In some cases, the second segment may be configured to be adaptive in three dimensions.

In some cases, the second segment may be adaptive via a moveable component or a moveable joint or a sliding joint.

In some cases, the movable component may be moveable by rotating the moveable component.

In some cases, the moveable component may be moveable by sliding the moveable component through a shaft.

In some cases, the second segment may include a slot through which at least one of a plurality of fasteners passes, the slot to accommodate differences in position of the at least one of the plurality of fasteners.

In some cases, the joint connector may further include a clamp to vertically clamp the second track section, the vertical clamp adjustable in a vertical direction to adapt to a difference in a vertical dimension of the first and second track sections.

In some cases, the joint connector may further include a vertical alignment reference to vertically align the first segment with the attachment feature of the first track section.

In some cases, the joint connector may further include a thermal adaptor for adapting to thermal expansion/contraction of the first and second track sections.

In another aspect, there is provide a method for connecting track sections of a conveyor, the method including: securing a first track section and a second track section in an aligned position with a temporary connector; connecting a first segment of an adaptive joint connector to the first track section; adaptively connecting a second segment of the adaptive joint connector to the second track section to hold the first track section and the second track section in an aligned position; and removing the temporary connector.

In some cases, the adaptively connecting may include adjusting the second segment in one or more of three dimensions.

In some cases, the method may further include connecting the first track section and the second track section after the adaptively connecting.

In yet another aspect, there is provided a linear motor conveyor system including: a first track section comprising a first alignment feature; a second track section comprising a second alignment feature related to the first alignment feature; a joint connector for connecting the first track section with the second track section, the joint connector including: a first segment for attachment to an attachment feature of the first track section; and a second segment for attachment to an attachment feature of the second track section wherein the second segment is configured to be adaptive to non-alignment of the attachment features of the first and second track sections in order to maintain alignment of the first and second alignment features after installation of the joint connector.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 3E shows a rear view of the clamp;

FIG. 3F shows a side view of the clamp;

DETAILED DESCRIPTION

Figure 1:
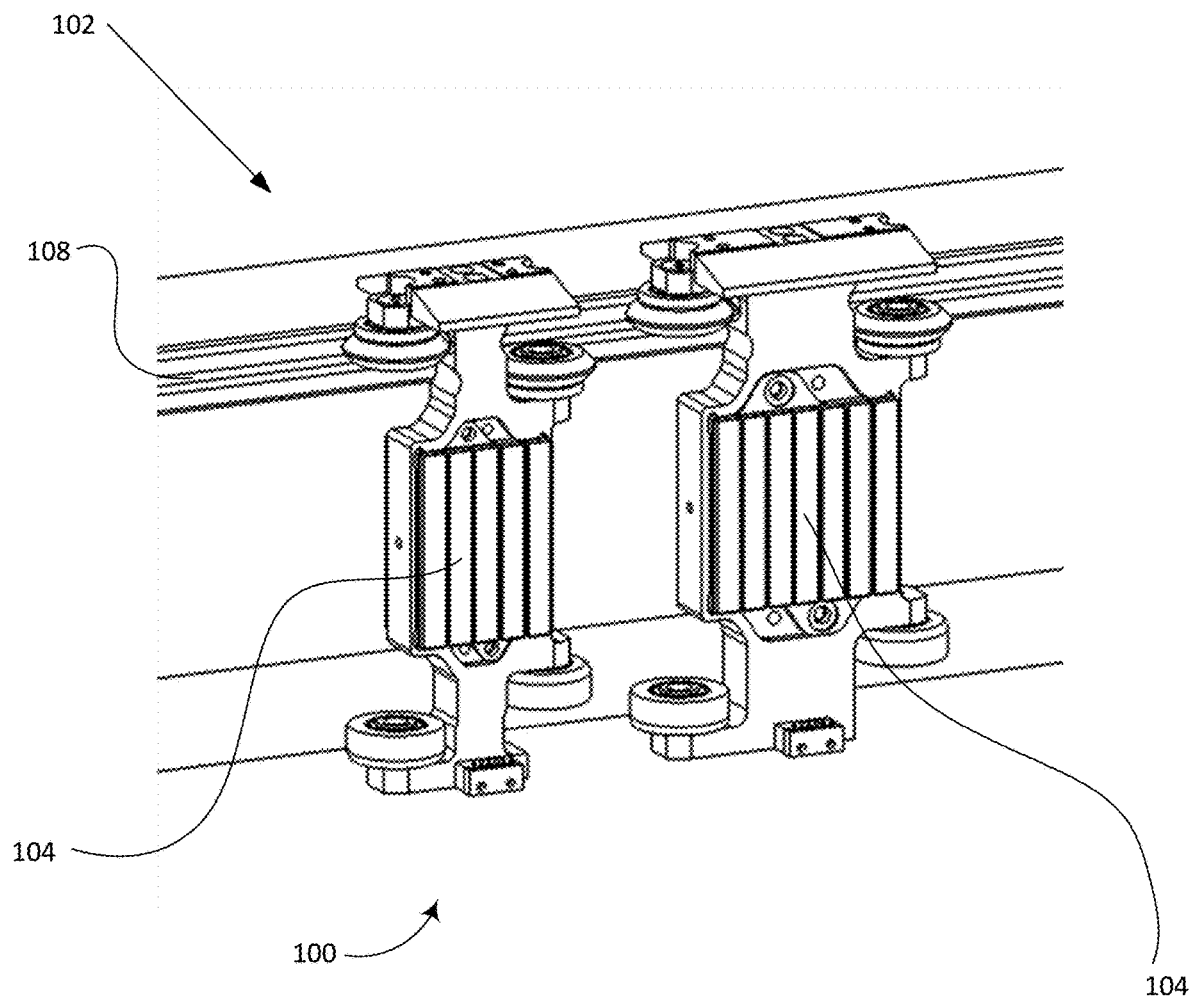
FIG. 1 shows an embodiment of a conveyor system that includes a track and two moving elements.

Generally, the present disclosure provides an improved system and method of connecting conveyor track sections. Generally, it is intended that the conveyor track sections (sometimes referred to as track segments) can achieve an alignment tolerance of 100 microns or less, 50 microns or less, 40 microns or less, or 25 microns or less. Embodiments herein involve a joint connector and method that provides for: connecting a first and second track section in place in an aligned position with a temporary connector; connecting a first side of a permanent connector to the first track section; and adaptively connecting a second side of the permanent connector to the second track section to hold the two track sections in relation to each other with limited possible movement from an aligned position. The adaptive connection is obtained by providing adjustment mechanisms that allow the second side of the connector to adapt to variances in dimensions within a manufacturing tolerance of the second track section in relation to the first track section.

Throughout this specification and the appended claims, the term "temporary connector" refers to a connector that may be employed during the process of connecting conveyor track sections, but is not present once that process is completed. In contrast, throughout this specification and the appended claims, the term "permanent connector" refers to a connector that remains in place after the process of connecting track sections is completed, however the connector may in fact be removable (for example, as part of the process of disassembling the track sections). The use of a temporary connector may achieve alignment of the track sections within a first alignment tolerance. The use of a permanent connector may maintain the alignment of the track sections within a second alignment tolerance by holding the track sections together with limited possible movement from alignment.

In a non-exclusive example, track sections may be manufactured with a first side including a guide rail and a second side, typically flat, opposite the first side, where the first side and the second side are separated by a track thickness. In this example, the track thickness from the first side to the second side may vary between different track sections due to manufacturing tolerances. This can be an issue if the manufacturing tolerance is larger than the alignment tolerance of the guide rail. How flat the second side will be may also vary within manufacturing tolerances and the height of the second side may also be different. Clamping, or otherwise joining, a first and second track section in place to align the guide rails of the first track section and the second track section within the alignment tolerance may cause the second sides (i.e. the sides to which a joint coupler may attach) of the track sections to be non-aligned due to a difference in thickness/flatness/height between the first and second track sections. In other words, alignment of the guide rails within an alignment tolerance may still result in the opposite side of the track sections to be non-aligned. A joint coupler that cannot accommodate non-aligned attachment features/surfaces (for example, a joint coupler that is flat and not adaptive) may force the second flat sides of the track sections into alignment, and thereby put the guide rails out of alignment.

An adaptive joint coupler is configured to adapt to non-aligned attachment features/surfaces by including one or more adjustment mechanisms to allow a first portion of the adaptive joint coupler to be out of alignment with a second portion of the adaptive joint coupler, where the difference in alignment between the first and second portions is adjusted to be equal to the non-alignment of the attachment surfaces. The adaptive joint coupler may then be affixed to the joint between the two track sections, where the difference in alignment between the second flat sides of the two track sections is accommodated by the difference in alignment between the first and second portions of the adaptive joint coupler. In other words, the adaptive joint coupler may be adaptively connected to the two track sections by attaching the adaptive joint coupler to the two track sections when the adaptive joint coupler is configured to adapt to non-aligned attachment surfaces of the two track sections.

Throughout this specification and the appended claims, alignment of portions of the adaptive joint coupler is determined with regard to the part(s) of the adaptive joint coupler in contact with the respective track sections. In other words, a joint connector is adaptive when the part(s) of a first portion in contact with a first track section and the part(s) of a second portion in contact with a second track section have a difference in alignment equal to a difference in alignment of the first and second flat sides of the two track sections. Non-exclusive examples of adjustment mechanisms include moveable components and moveable joints. For example, the second portion may include a moveable component configured to be in contact with the second track section, where movement of the moveable component thereby allows the alignment of the second portion and the first portion to be adjusted. In another example, the second portion may coupled to the first portion via a moveable joint (for example a sliding joint), where movement of the entire second portion relative to the first portion allows the alignment of the second portion and the first portion to be adjusted. In other words, the adaptive joint coupler may adapt to variances in various dimensions within the manufacturing tolerance of the two track sections by adjusting the alignment of the first and second portions of the adaptive joint coupler.

In order to make a conveyor system and the accompanying track sections easier to assemble, the method of connecting the track sections should be as simple as possible. A non-exclusive example of a simple method of connecting track sections is a method by which a person with relatively basic mechanical skills may perform the assembly process by following a series of instructions that achieve alignment of the guide rails within an alignment tolerance and thereby allow smooth operation of the conveyor system. As noted above, in some cases, the alignment tolerance may be less than or equal to 100 microns, less than or equal to 50 microns, less than or equal to 40 microns, or less than or equal to 25 microns. In still other cases, the alignment tolerance may be any value in the range of equal to 100 microns or less.

In the following description, the examples relate to a linear motor conveyor system but the same or similar joint connector and method can generally be used with other conveyor systems that would benefit from alignment of tracks and easier mechanical assembly.

Figure 2:
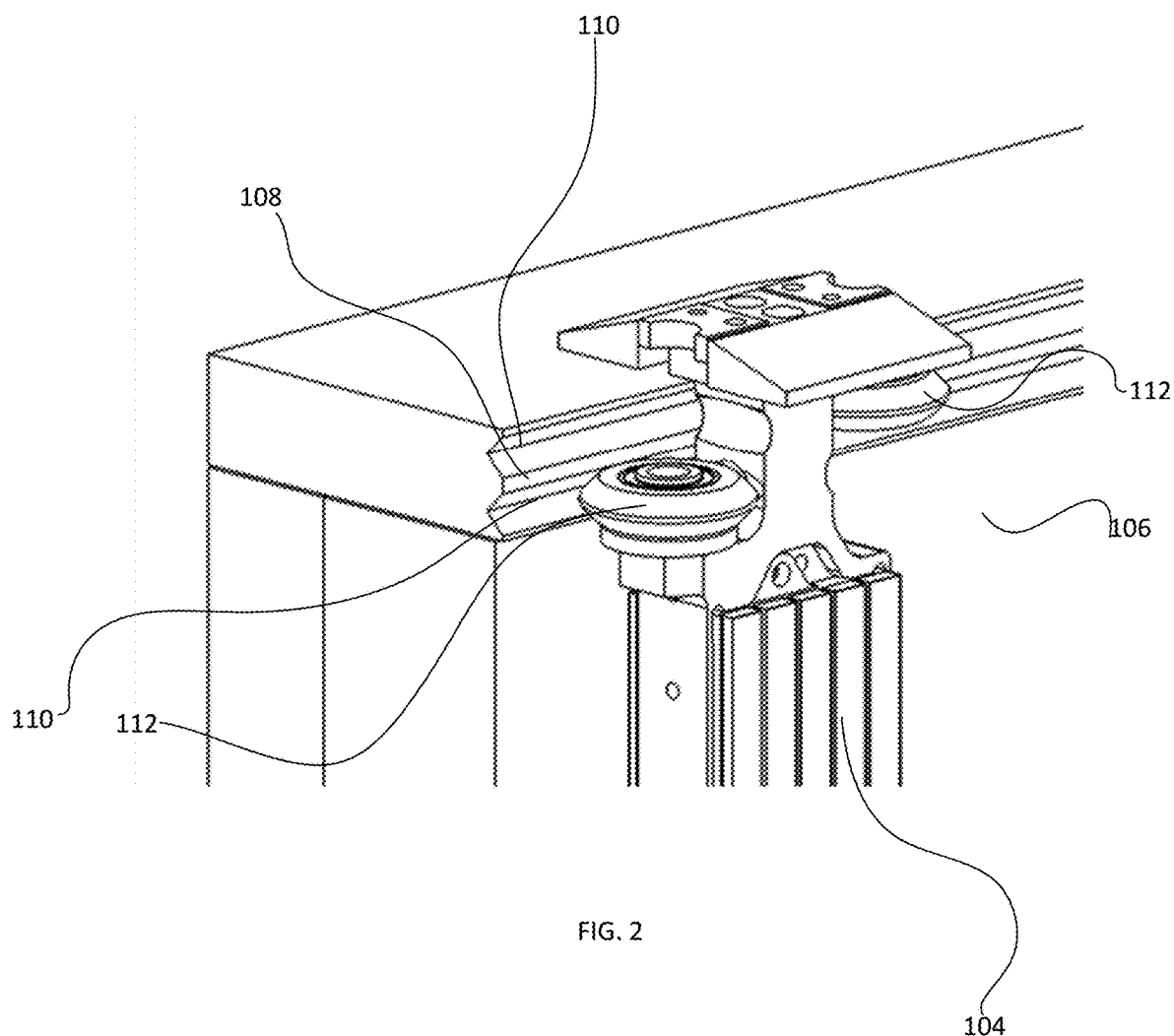
FIG. 2 shows an embodiment of an end of a track section.

FIG. 1 illustrates an embodiment of a linear motor conveyor system 100 that includes a track 102 and two moving elements 104. FIG. 2 illustrates an end of a track section 106, showing the shape of a guide rail 108. The track 102 may be made up of track sections 106 joined end-to-end, with each guide rail 108 of each track section 106 aligned with the guide rail 108 of adjacent track sections 106. In the embodiment shown in FIG. 2, the track section 106 includes a guide rail 108 located in an upper portion of track section 106, and the guide rail 108 has dual shaped grooves 110. The moving elements 104 include bearings 112 that are correspondingly shaped in order to run along the guide rail 108, each bearing 112 running inside a respective shaped groove 110.

In a particular embodiment, the track section 106 may produce a magnetic force for moving the moving element 104 along the track 102. The magnetic force can also capture the moving element 104 on the track 102. In some cases, the magnetic force is created by the interaction of the magnetic flux created by coils (not shown) embedded in/under the track section and magnetic elements (not shown) of the moving element 104. The magnetic force can be thought of as having a motive force component for directing movement of the moving element 104 along a direction of travel on the track 102, and a capturing force component to laterally hold the moving element 104 on the track 102 and in spaced relation to the track surface. In at least some conveyor systems, the motive force and the capturing force can be provided by the same magnetic flux.

Generally speaking, the track sections 106 will be mounted on a support structure (not shown in FIGS. 1 and 2) so as to align and abut one another in order to form the track 102. In order to be modular, each track section 106 may house self-contained electronic circuitry for powering and controlling the track section. Each track section may be controlled by a control system.

An example of a linear motor conveyor system is described in more detail in U.S. Pat. No. 8,397,896 to Kleinikkink et al., which is hereby incorporated herein by reference.

Figure 3A:
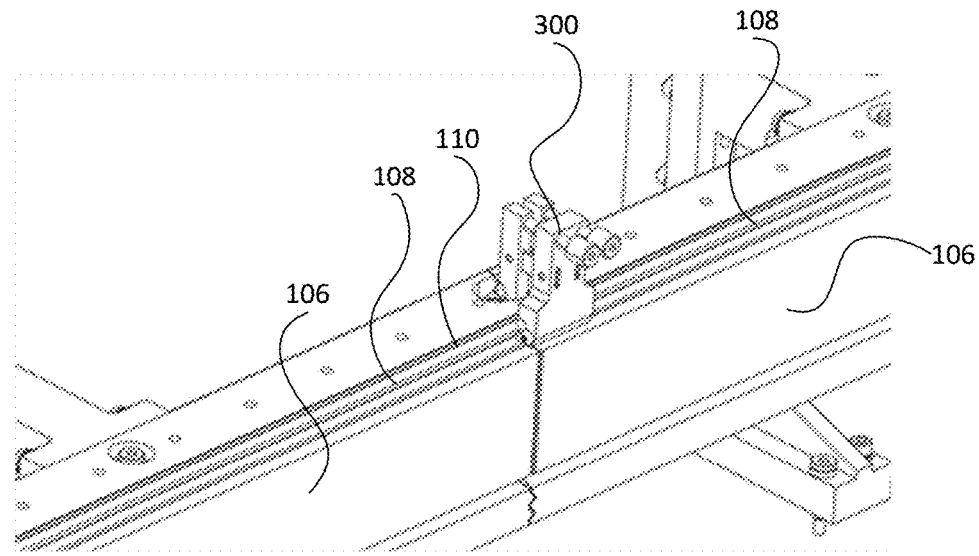
FIG. 3A shows a front perspective view of an embodiment of a clamp that is attached to two track sections.
Figure 3B:
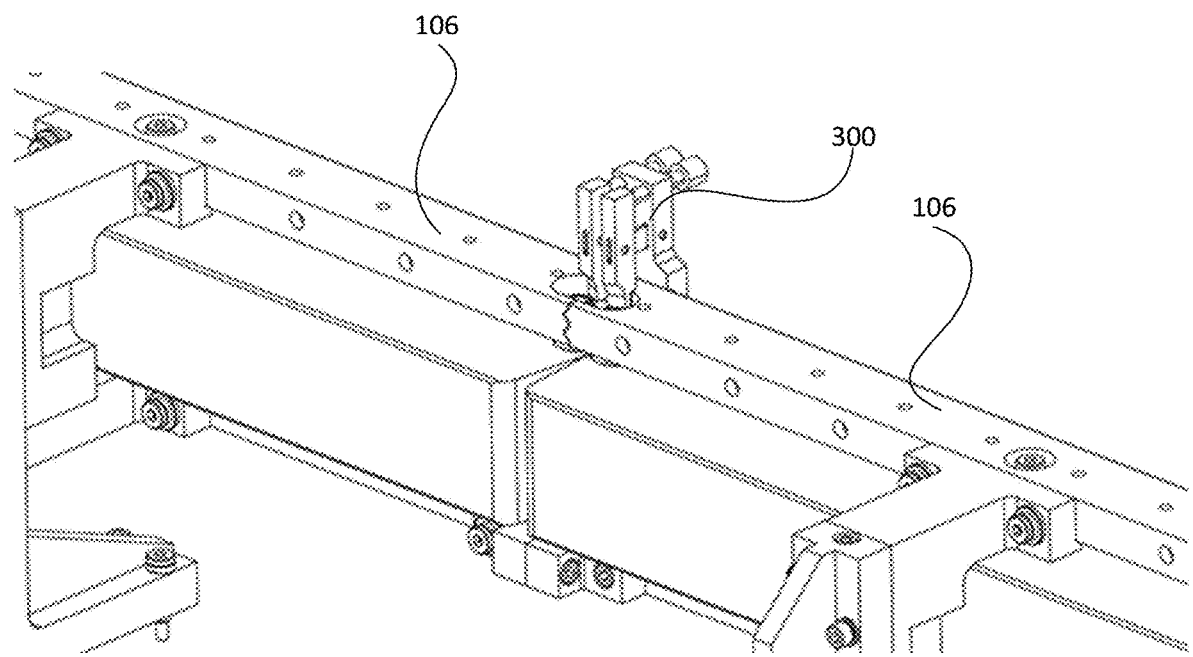
FIG. 3B shows a rear perspective view of the clamp and track sections of FIG. 3A.
Figure 3C:
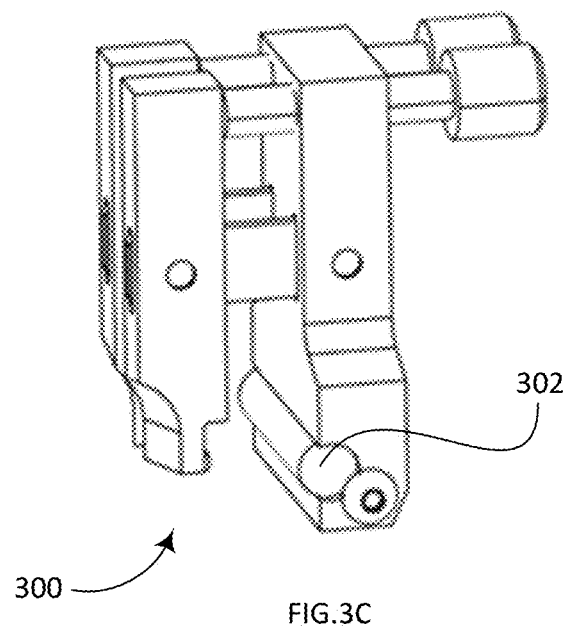
FIG. 3C shows a perspective view of the clamp.
Figure 3D:
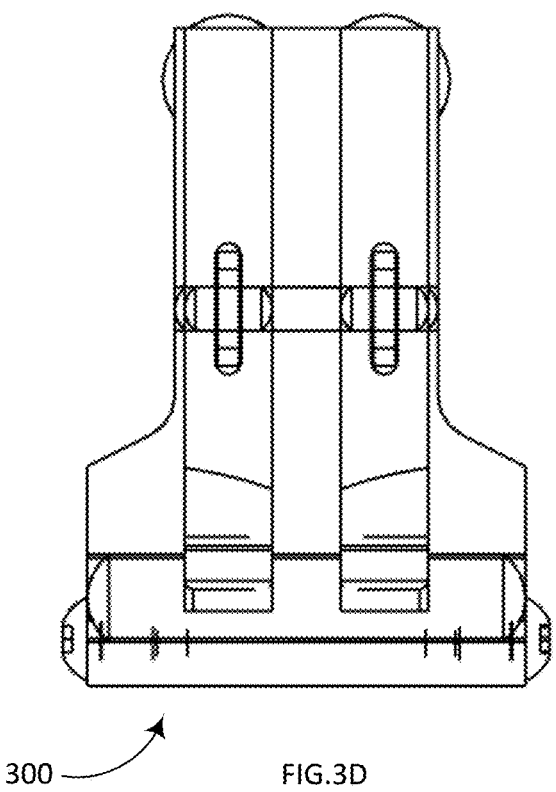
FIG. 3D shows a front view of the clamp.

As noted above, the two track sections to be connected may first be brought into alignment by using a temporary connector that is configured to align the guide rails of the track sections within a predetermined alignment tolerance. For example, the temporary connector may include a dowel or the like, sized to fit within the rail or the like. In a particular case, the temporary connector may include a dowel sized to fit into a groove 110 of a guide rail 108 of the track sections. FIG. 3A shows a front perspective view of an embodiment of a temporary connector (in this case, a clamp) 300 that is attached to the upper rail of the track section 106 to hold the guide rails 108 on each track section in alignment within the alignment tolerance. FIG. 3B shows a rear perspective view of the clamp 300 attached to the upper rail of the track section 106. FIG. 3C shows a perspective view of the clamp 300. FIG. 3D shows a front view of the clamp 300. FIG. 3E shows a rear view of the clamp 300. FIG. 3F shows a side view of the clamp 300. In this embodiment, the clamp 300 includes a dowel 302. The dowel 302 is provided to aid in alignment of the guide rails 108 of the first and the second track sections when the clamp 300 is clamped to the track sections by placing the dowel 302 within the guide rails 108 across the gap between the track sections. Placing the dowel 302 within the guide rails 108 may align the track sections within an alignment tolerance by providing greater alignment at the location of the guide rails 108. The clamp 300 can be configured to hold either flat or shaped rails within an alignment tolerance. In some cases a single dowel may be used, while in other cases a plurality of dowels may be used, for example one for each groove. In some cases, the dowel 302 may be shaped to correspond with the shape of the guide rails.

In the case of shaped rails, the clamp 300 can provide alignment both vertically and horizontally. Having the clamp 300 keep alignment of the wheel/bearing riding surfaces of the guide rails 108 within an alignment tolerance is intended to provide for less wear on the wheels/bearings and less noise, vibration and the like. In this embodiment, the clamping position and clamping force of clamp 300 may be adjusted independently for each track section 106 to which clamp 300 is clamped. It will be understood that various types of clamps with attached or separate dowels (or the like) may be used as appropriate.

Figure 4A:
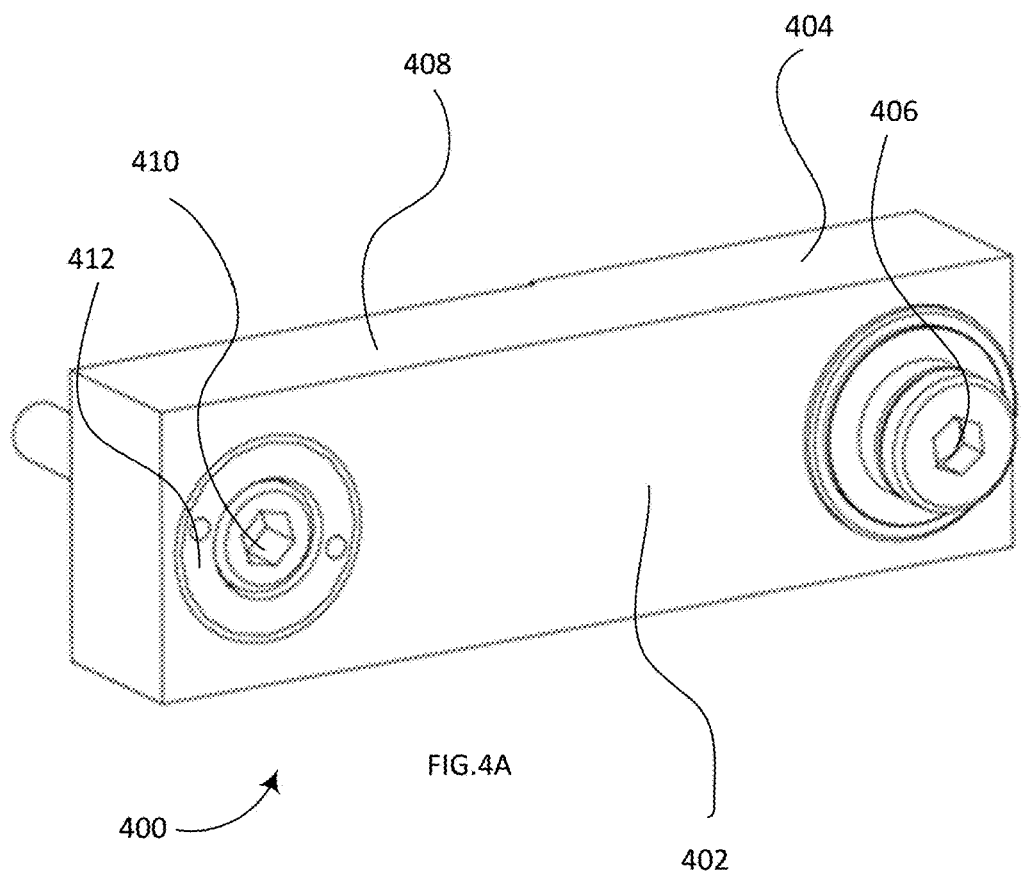
FIG. 4A shows a front perspective view of an embodiment of a joint connector.
Figure 4B:
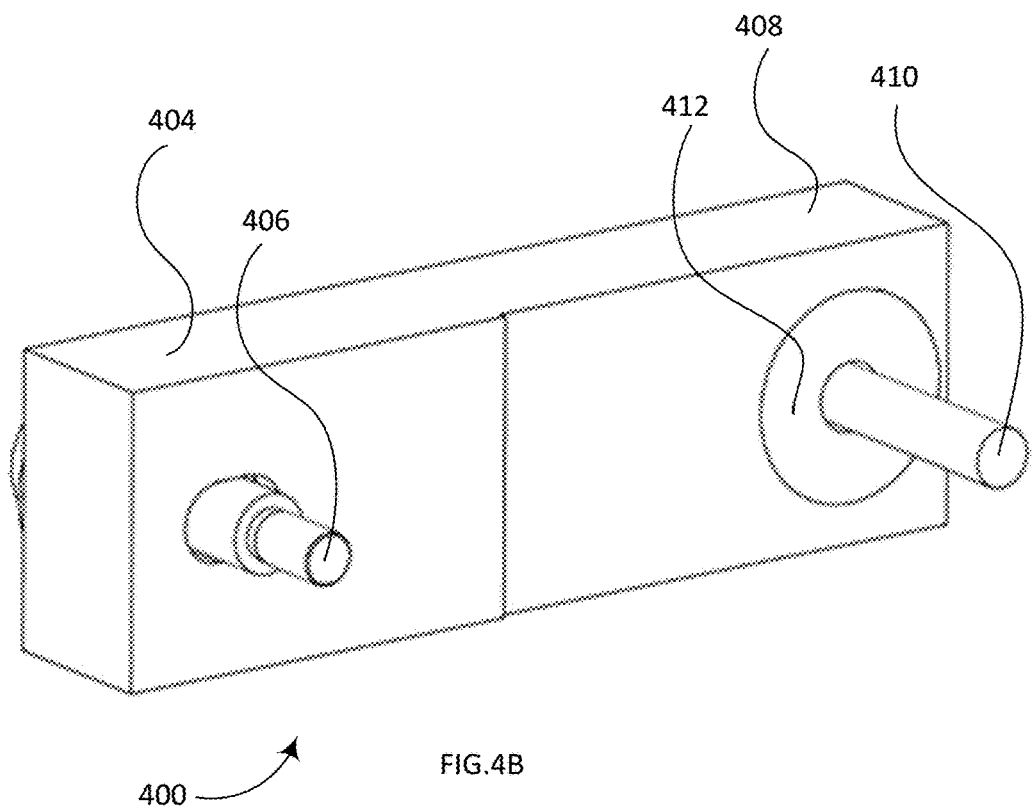
FIG. 4B shows a back perspective view of the joint connector of FIG. 4A.

FIG. 4A shows a front perspective view and FIG. 4B shows a back perspective view of an embodiment of a joint connector 400. Throughout FIGS. 4A to 9F, references may be made to screws, bolts, and/or threaded shafts, however, the general term "fastener" can be considered to apply and one of skill in the art will understand what type of fastener, whether screw, bolt, or the like will be appropriate. Further, generally speaking, threaded surfaces are not depicted as such for clarity.

The joint connector 400 includes a generally rectangular body 402 generally having two sides (which may be referred to alternatively as "portions" or "sections"). In these embodiments, the body is described as rectangular for convenience, however other shapes can be acceptable as long as sufficient contact is made with the track sections. A first side 404 is attached to a rear of a first track section via a springed bolt 406 and is in contact with the first track section. A second side 408 is slightly "cut-back" from being flush with the contact side of the first side 404 and is attached to a second track section horizontally with a threaded shaft 410. The amount of "cut-back" can be determined based on the amount of manufacturing tolerance for the track sections in order to allow for a maximum difference in manufacturing tolerances. The joint connector 400 includes a circular adjuster 412. The circular adjuster 412 is moveable to be in contact with the second track section when the second side 408 is attached to the second track section. In other words, the circular adjuster 412 is an example of a moveable component. The position of the circular adjuster 412 relative to the first side 404 is adjustable by rotating the circular adjuster 412, for example due to threading present on the circular adjuster 412 engaging corresponding threading present on the joint connector 400. Differences in the dimensions of the track section due to manufacturing tolerances may be adapted to by adjusting the positioning of the circular adjuster 412. For example, if the first track section has a different thickness in horizontal or vertical dimensions than the second track section due to variations in manufacturing (even if within manufacturing tolerances for that part), the joint connector can adapt so that, after connection and removal of the clamp 300, the rails of the track section are still within the required alignment tolerances. Firmly affixing the joint connector 400 to each of the track sections with this adaptive approach is intended to hold the guide rails in alignment within a predetermined alignment tolerance.

The joint connector 400 may be affixed to the track sections via the springed bolt 406 and the threaded shaft 410. By turning (or "driving", "tightening" or the like) the circular adjuster 412 is intended to make contact with the second track section, the circular adjuster 412 adapts to differences in track section dimensions within the manufacturing tolerance.

Figure 5A:
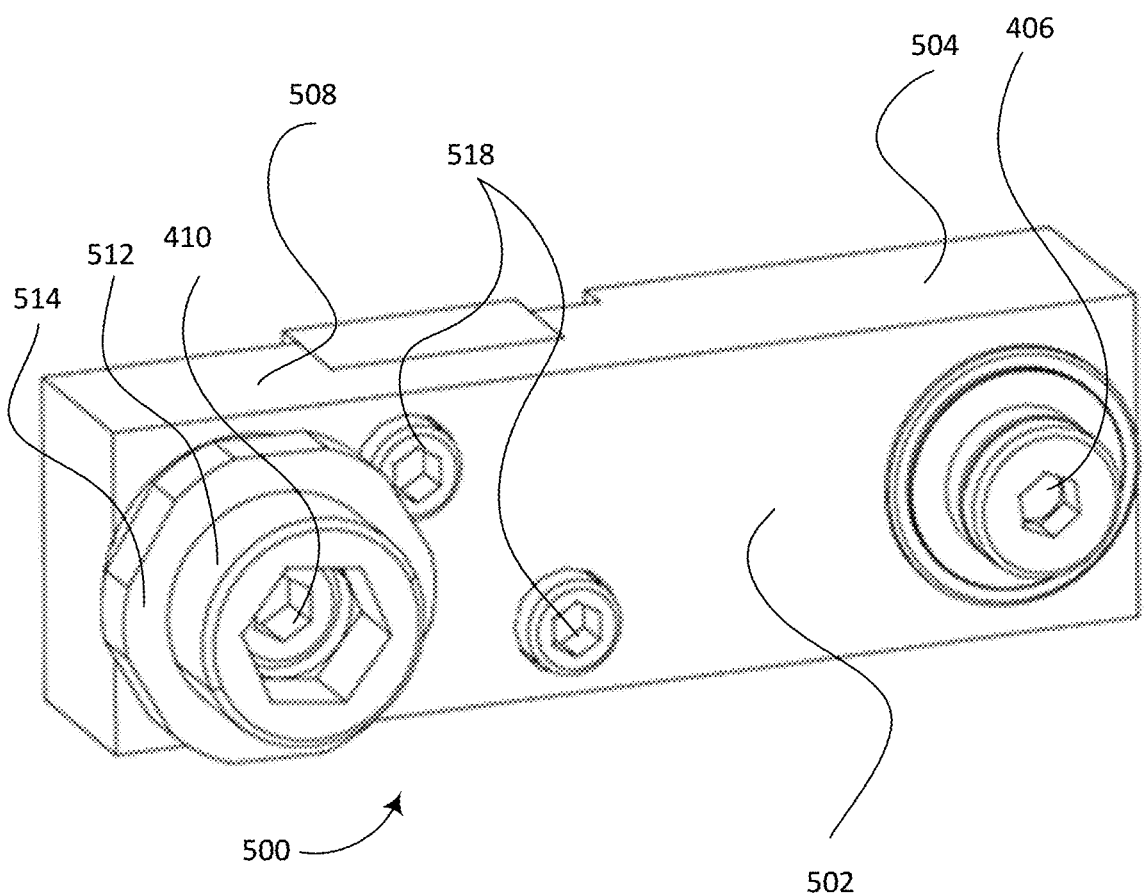
FIG. 5A shows a front perspective view of another embodiment of a joint connector.
Figure 5B:
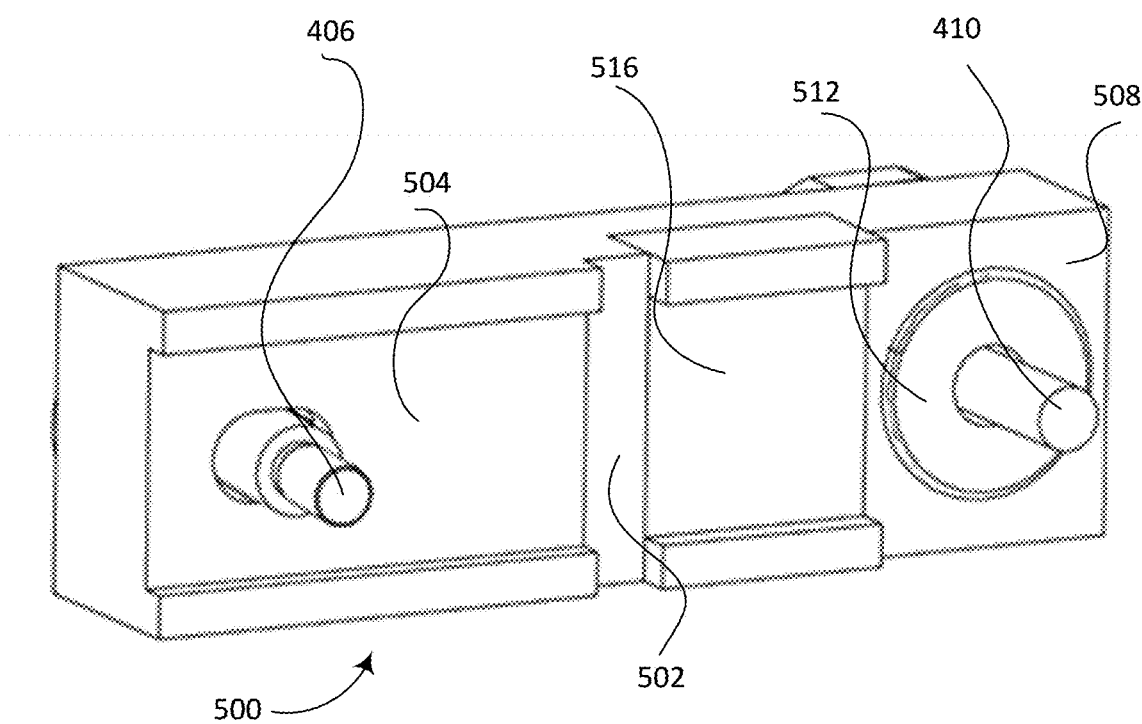
FIG. 5B shows a back perspective view of the joint connector of FIG. 5A.

FIG. 5A shows a front perspective view and FIG. 5B shows a back perspective view of another embodiment of a joint connector 500.

The joint connector 500 includes a rectangular body 502 generally having two sides. A first side 504 is attached to a first track section via a springed bolt 406 and is brought into contact with the first track section. A second side 508 is slightly "cut-back" from being flush with a contact side of the first side 504 and is attached to a second track section horizontally with a threaded shaft 410. The joint connector 500 includes a circular adjuster 512 and a locking nut 514. The circular adjuster 512 is moveable to be in contact with the second track section when the second side 508 is attached to the second track section. In other words, the circular adjuster 512 is an example of a moveable component. The position of the circular adjuster 512 relative to the first side 504 is adjustable by rotating the circular adjuster 512, for example due to threading present on the circular adjuster 512 engaging corresponding threading present on the joint connector 500. The locking nut 514 may be turned to lock or unlock rotation of the circular adjuster 512. Differences in track section dimensions within a manufacturing tolerance may be adapted to by adjusting the position of the circular adjuster 512. Affixing the joint connector 500 to each of the first and second track sections is intended to hold the guide rails in alignment within an alignment tolerance once the clamp is removed. The joint connecter 500 includes a vertical c-clamp 516. Vertical c-clamp 516 may vertically capture the second track section, and may be adjusted vertically to adapt to any difference in vertical tolerances/dimensions between the first track section and the second track section due to manufacturing tolerances. The vertical position of the vertical c-clamp 516 may be fixed with screws 518. Vertically capturing the second track section may include holding the joint connector in alignment with the second track section in a vertical direction.

Figure 6A:
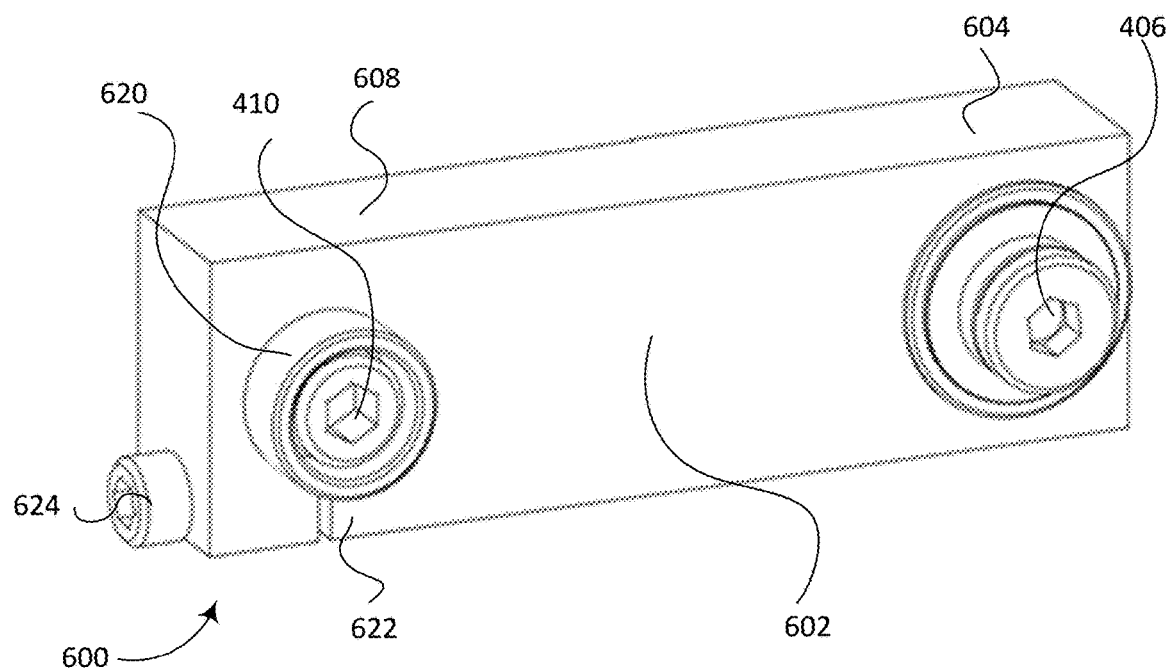
FIG. 6A shows a front perspective view of another embodiment of a joint connector.
Figure 6B:
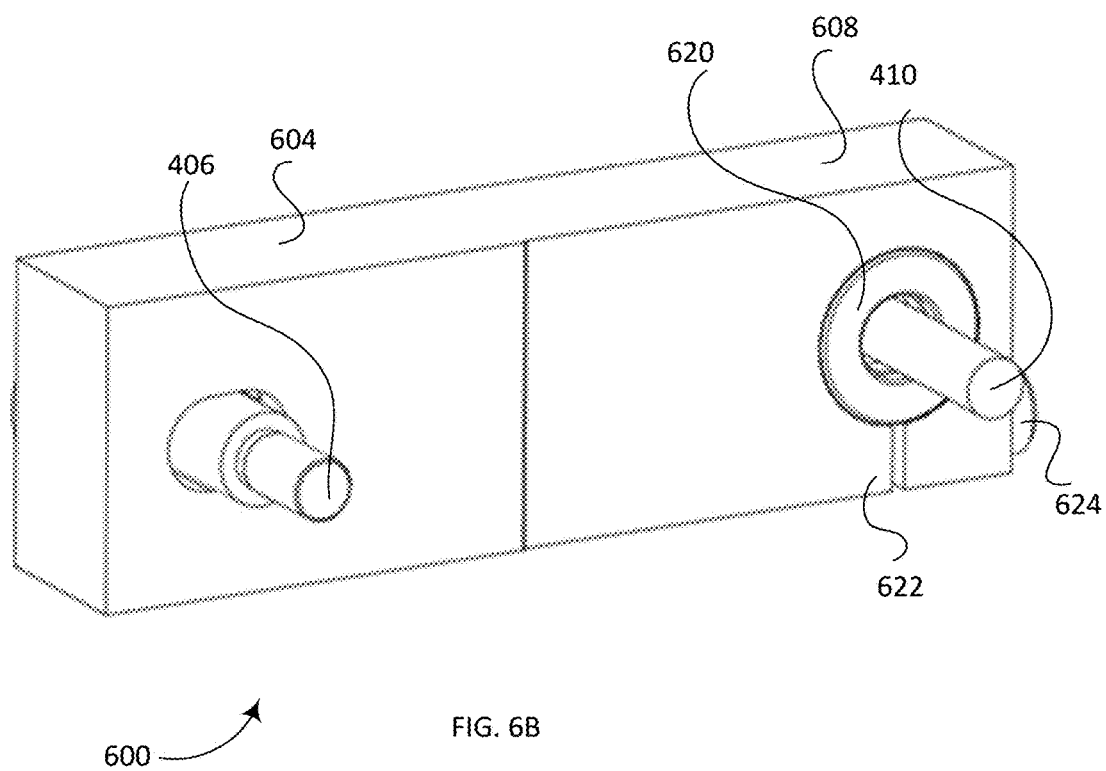
FIG. 6B shows a back perspective view of the joint connector of FIG. 6A.

FIG. 6A shows a front perspective view and FIG. 6B shows a back perspective view of another embodiment of a joint connector 600.

The joint connector 600 includes a rectangular body 602 generally having two sides. A first side 604 is attached to a first track section via a springed bolt 406 and is in contact with the first track section when the first side 604 is attached to the first track section. A second side 608 is slightly "cut-back" from being flush with the contact side of the first side 604 and is attached to a second track section horizontally with a threaded shaft 410. The joint connector 600 includes a smooth shaft 620 and a spring clamp 622 to hold the smooth shaft 620 in place by via screw 624. The smooth shaft 620 is in contact with the second track section when the second side 608 is attached to the second track section. The position of the smooth shaft 620 relative to the first side 604 is adjustable by sliding smooth shaft 620. In other words, the smooth shaft 620 is an example of a moveable component. Differences in track section dimensions within a manufacturing tolerance may be adapted to by adjusting the position of the smooth shaft 620. The joint connector 600 lacks a vertical capture feature, however vertical movement of the track sections (e.g. during thermal cycling) may be prevented by springed bolt 406 and/or the joint connector 600 holding the track sections in a fixed position.

The joint connector 600 may be less likely to experience movement of the smooth shaft 620 as smooth shaft 620 lacks threading and therefore does not experience thread backlash when forces are applied to smooth shaft 620. The joint connector 600 may be less likely to experience overdriving of the smooth shaft 620.

Figure 7A:
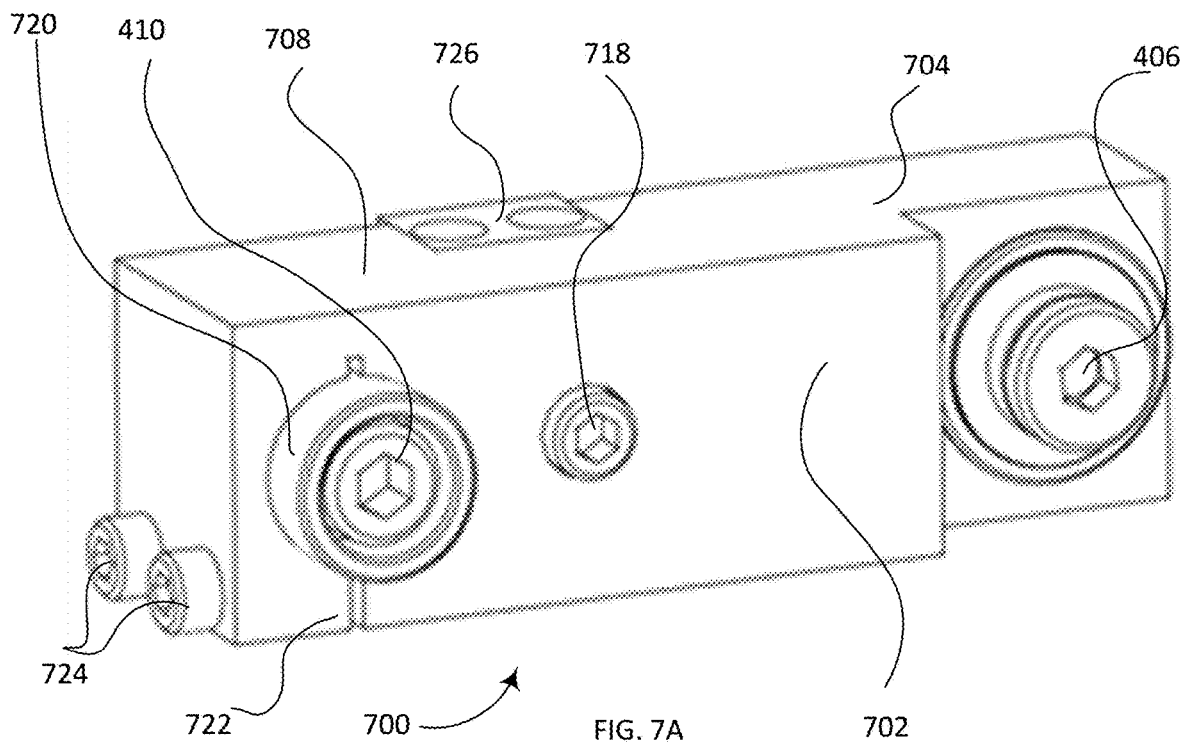
FIG. 7A shows a front perspective view of another embodiment of a joint connector.
Figure 7B:
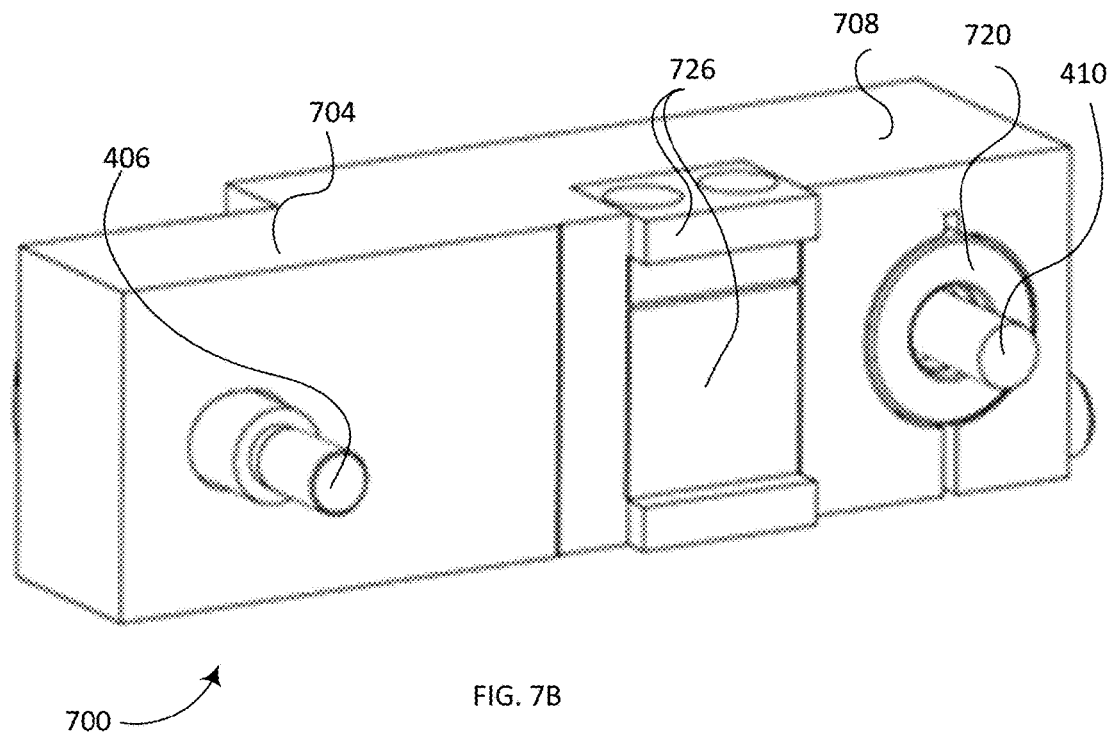
FIG. 7B shows a back perspective view of the joint connector of FIG. 7A.

FIG. 7A shows a front perspective view and FIG. 7B shows a back perspective view of another embodiment of a joint connector 700.

The joint connector 700 includes a rectangular body 702 generally having two sides. A first side 704 is attached to a first track section via a springed bolt 406 and is in contact with the first track section when the first side 704 is attached to the first track section. The springed bolt 406 may be recessed into the body 702. A second side 708 is slightly "cut-back" from being flush with the contact side of the first side 704 and is attached to a second track section horizontally with a threaded shaft 410. The joint connector 700 includes a smooth shaft/rod 720 and a spring clamp 722 to hold the smooth shaft 720 in place by via screws 724. The smooth shaft 720 is in contact with the second track section when the second side 708 is attached to the second track section. In other words, the smooth shaft 720 is an example of a moveable component. Differences in track section dimensions within a manufacturing tolerance may be adapted to by adjusting the position of the smooth shaft 720. The diameter of the smooth shaft 720 is larger than the diameter of the smooth shaft 620 of the previous embodiment. While the joint connector (e.g. the body) may be made of any appropriate material, the material of the rectangular body 702 is preferably stiffer and may be, for example, steel or a similar material, to provide the additional stiffness. The joint connector 700 may include a split vertical clamp 726 to hold the rail sections to the joint connector 700 in a vertical direction. The split vertical clamp 726 may be adjusted in a vertical direction, and the two pieces of the split vertical clamp 726 may be tightened to vertically capture the second track section.

The joint connector 700 is intended to be simple to attach and includes seven screws which may be tightened, in some cases in a specific sequence, to align the guide rails within the desired alignment tolerance.

Figure 8A:
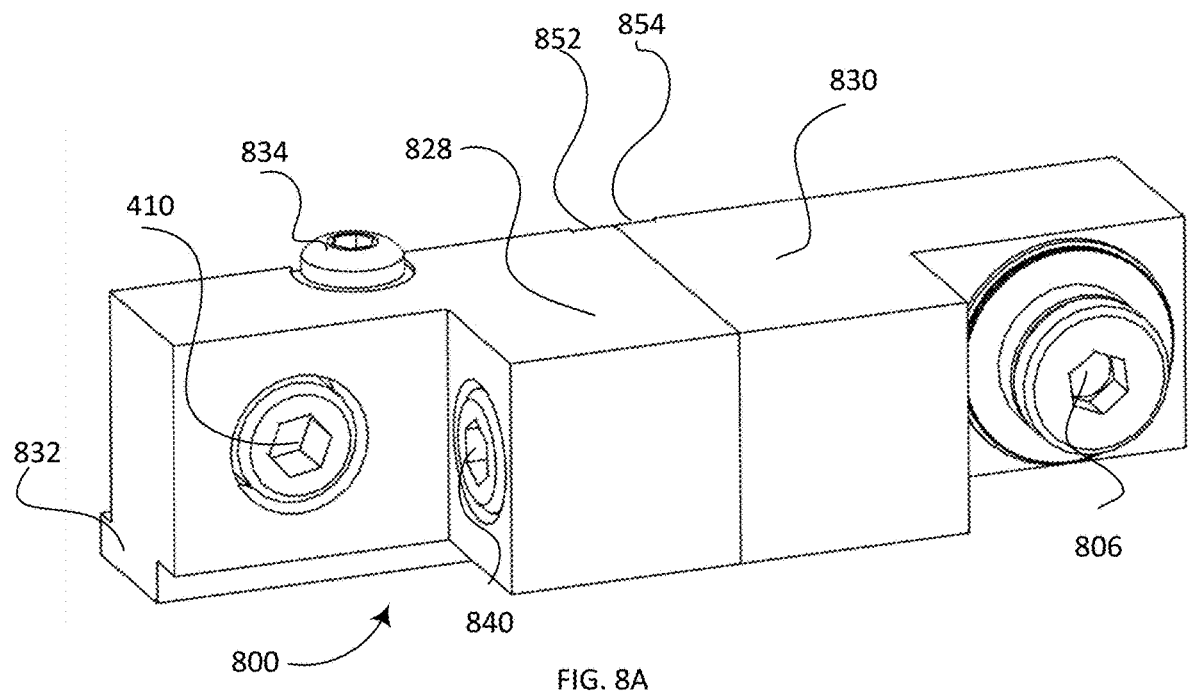
FIG. 8A shows a front perspective of another embodiment of a joint connector.
Figure 8B:
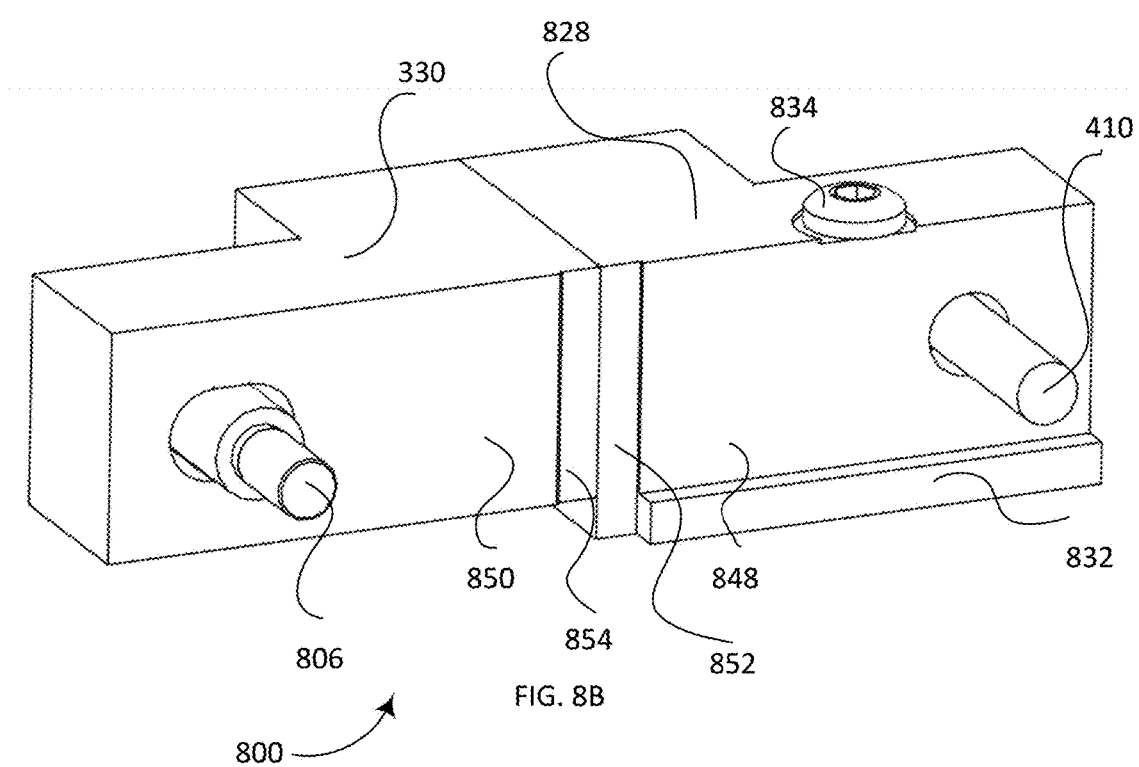
FIG. 8B shows a back perspective view of the joint connector of FIG. 8A.

FIG. 8A shows a front perspective view and FIG. 8B shows a back perspective view of another embodiment of a joint connector 800.

The joint connector 800 includes two sides/portions/sections that are provided as a first bracket 828 and a second bracket 830. The first bracket 828 aligns vertically to a first rail via a reference edge 832 on the bottom of the first bracket 828 and a button head screw 834 on the top of the first bracket 828. The first bracket 828 is in contact with the first track section when the first bracket 828 is attached to the first track section. The first bracket 828 is attached horizontally to the first rail with a threaded shaft 410. The second bracket 830 attaches to the second rail with a springed bolt 806. The springed bolt 806 may include a thermally compensated screw arrangement (sometimes referred to as a thermal adaptor). The second bracket 830 is in contact with the second track section when the second bracket 830 is attached to the second track section. Differences in track section dimensions, including vertical position of each guide rail, within a manufacturing tolerance can be adapted to by the contact where the first bracket 828 and second bracket 830 meet, since the first and second brackets may be attached to one another separately from attaching each bracket to its respective rail section. In other words, the adaptive joint connector 800 includes a moveable joint between the first bracket 828 and the second bracket 830, in particular a sliding joint. The first bracket 828 is connected to the second bracket with a screw 840.

Visible in FIG. 8B are a first surface 848 of the first bracket 828 and a second surface 850 of the second bracket 830. The first surface 848 makes contact with the first track section when the first bracket 828 is affixed to the first track section, while the second surface 850 makes contact with the second track section when the second bracket 830 is affixed to the second track section. Also visible in FIG. 8B are a first cut-back section 852 and a second cut-back 854 of first bracket 828 and second bracket 830, respectively. The first cut-back section 852 and the second cut-back section 854 are located near the contact surface of the first bracket 828 and the second bracket 830.

The first cut-back section 852 and the second cut-back section 854 allow the mating surfaces of the joint connector 800 (i.e. each of the brackets) to be involved in setting the horizontal and vertical alignment of the brackets without interference at the joint itself. The goal is to have the location of the joint between the track sections positioned in at least one of the first cut-back section 852 and the second cut-back section 854.

This embodiment is intended to use a reduced number of fasteners that need to be tightened.

FIGS. 9A to 9F show various views of another embodiment of a joint connector 900.

Figure 9A:
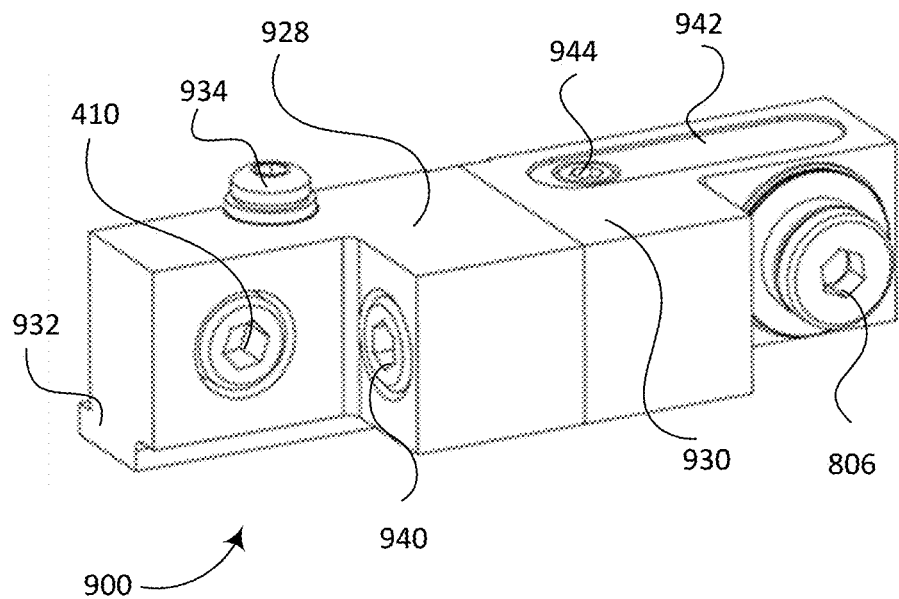
FIG. 9A shows a front perspective view of another embodiment the joint connector.

Joint connector 900 is similar to joint connector 800 but includes a spring clamp 942. FIG. 9A shows a front perspective view of the joint connector 900. The joint connector 900 includes two sides/portions/sections that are provided as a first bracket 928 and a second bracket 930. The first bracket 928 aligns vertically to a first rail via a reference edge 932 on the bottom of the first bracket 928 and a second fastener 934, for example, a button head screw on the top of the first bracket 928. The first bracket 928 is attached horizontally to the first rail with a threaded shaft 410. The first bracket 928 is in contact with the first track section when the first bracket 928 is attached to the first track section. The second bracket 930 attaches to the second rail with a springed bolt 806 (which may be a shoulder bolt 806). The second bracket 930 is in contact with the second track section when the second bracket 930 is attached to the second track section. Differences in track section dimensions, within a manufacturing tolerance, may be adapted to/for where the first bracket 928 and second bracket 930 come into contact, since the first and second brackets may be attached to one another separately from attaching each bracket to its respective rail section. In other words, the adaptive joint connector 900 includes a moveable joint between the first bracket 928 and the second bracket 930, in particular a sliding joint. The first bracket is connected to the second bracket with a screw 940. The springed bolt 806 may be adaptable within the second bracket 930 to thermal expansion/contraction effects by a spring clamp 942 held in place by a screw 944 (sometimes referred to as a thermal adaptor). During use, track sections, and, to a lesser extent, the joint connector itself, may experience changes in dimensions due to thermal expansion/contraction.

Figure 9B:
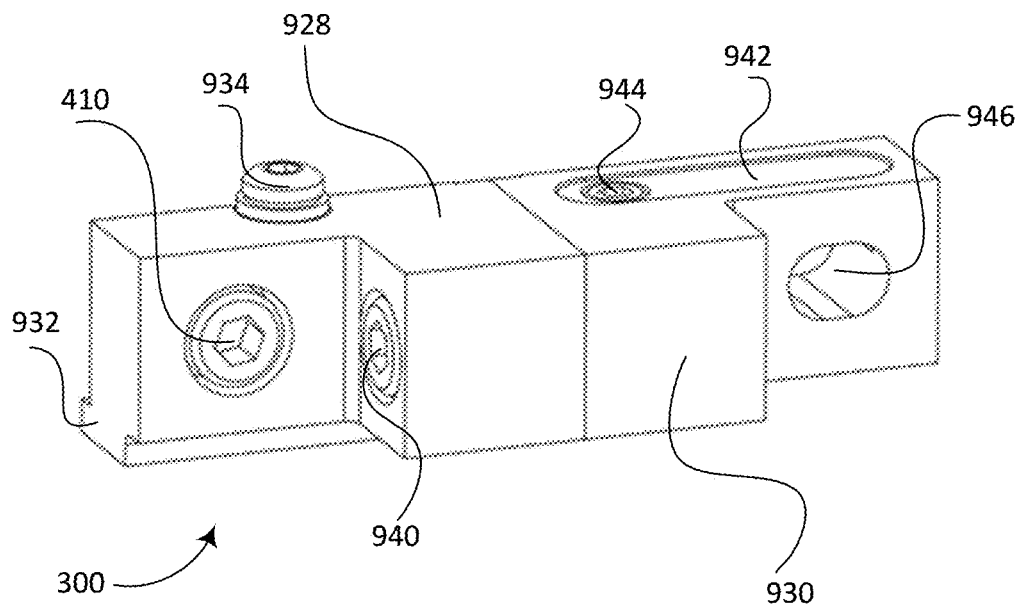
FIG. 9B shows a front perspective view of the joint connector of FIG. 9A without the springed bolt.

FIG. 9B shows a front perspective view of the joint connector 900 without the springed bolt 806. The slot 946 through which the springed bolt 806 passes through the second bracket 930 accommodates various positions of the second bracket 930 relative to the springed bolt 806 due to differences in manufacturing tolerances such as, for example, positions of the holes into which the springed bolt 806 attaches to the second track section due to manufacturing tolerances. As noted, differences in the position of the second bracket 930 relative to the shoulder bolt 806 may be due to variation of the dimensions of, for example, the first track section and/or the second track section due to thermal expansion/contraction.

Figure 9C:
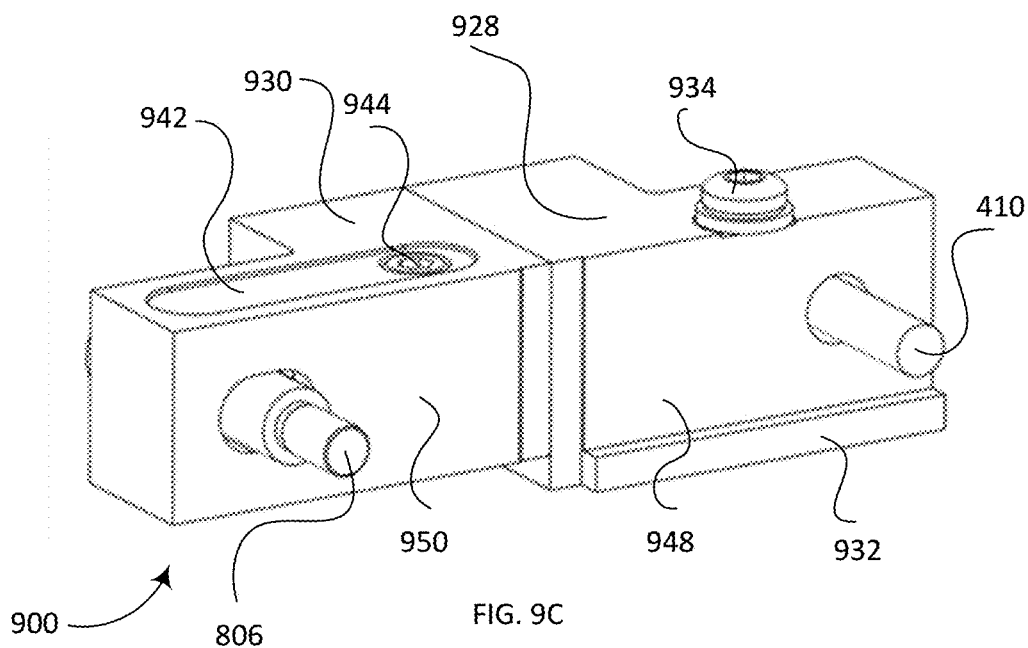
FIG. 9C shows a back perspective view of the joint connector of FIG. 9A.

FIG. 9C shows a back perspective view of the joint connector 900. Visible in FIG. 9C are a first surface 948 of the first bracket 928 and a second surface 950 of the second bracket 930. The first surface 948 makes contact with the first track section when the first bracket 928 is affixed to the first track section, while the second surface 950 makes contact with the second track section when the second bracket 930 is affixed to the second track section.

Figure 9D:
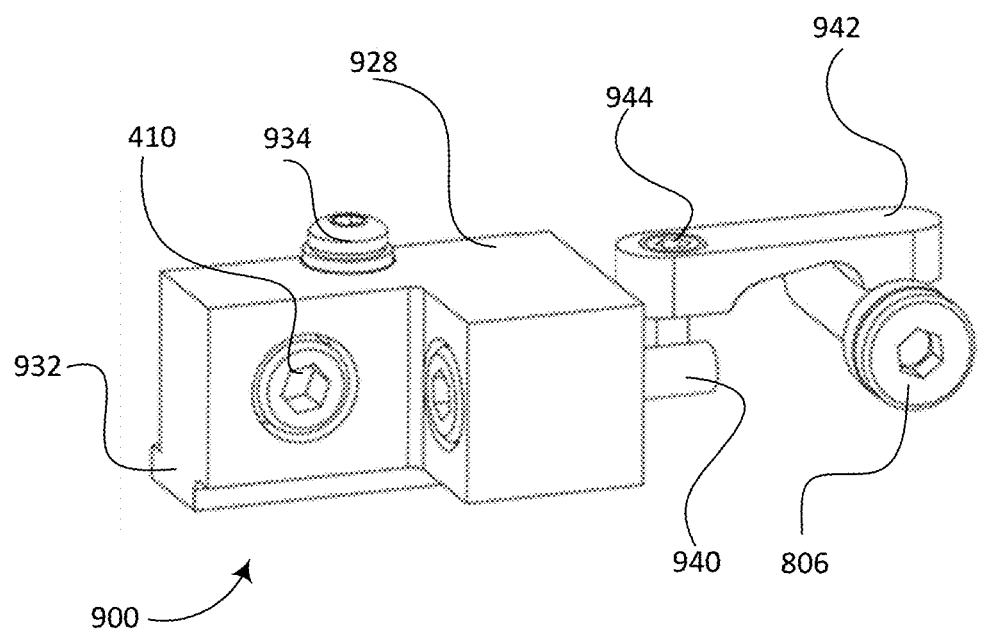
FIG. 9D shows a front perspective view of the joint connector of FIG. 9A omitting the second bracket.

FIG. 9D shows a front perspective view of the joint connector 900 omitting the second bracket 928. Visible in FIG. 9D is the shape of spring clamp 942, the position of screw 944, and the position at which spring clamp 942 engages springed bolt 806 to hold springed bolt 806 to the second bracket 930.

Figure 9E:
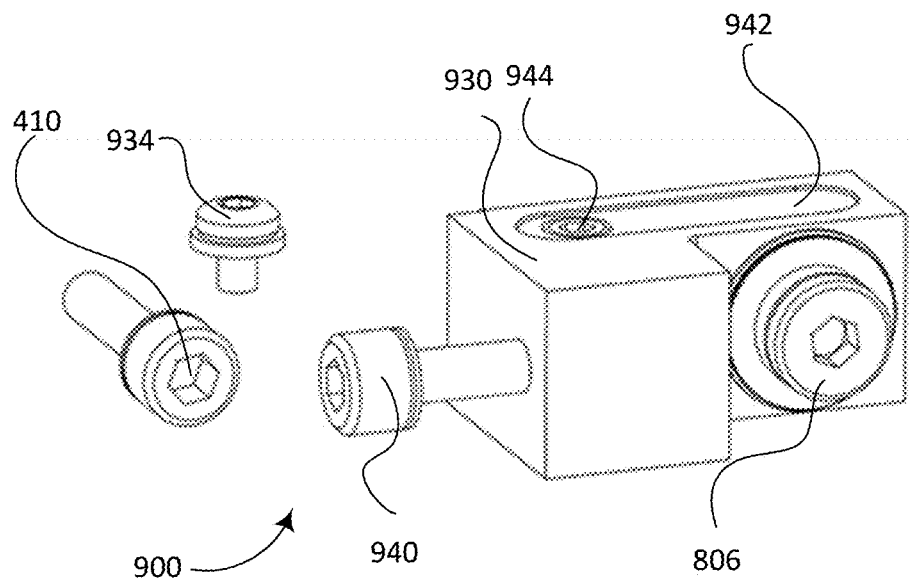
FIG. 9E shows a front perspective view of the joint connector of FIG. 9A omitting the first bracket.

FIG. 9E shows a front perspective view of the joint connector 900 omitting the first bracket 930. The relative positions of the threaded shaft 410, the second fastener 934 (the button head screw as illustrated), and the screw 940 are visible in FIG. 9E.

Figure 9F:
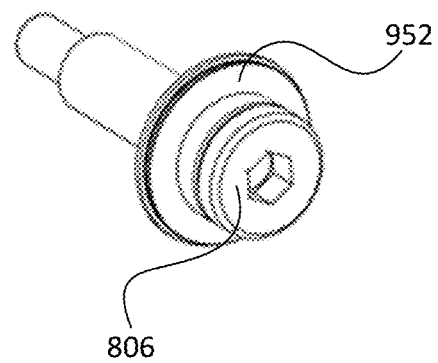
FIG. 9F shows a front perspective view of an embodiment of a springed bolt for the joint connector of FIG. 9A.

FIG. 9F shows a front perspective view of the springed bolt 806. The springed bolt 806 includes a spring washer 952. Spring washer 952 is intended to provide a clamping force to hold the joint connector 900 against the rail with sufficient force to hold the guide rails within an alignment tolerance, while still allowing the joint connector 900 to accommodate changes in position of the springed bolt 806 due to thermal expansion/contraction. In one particular non-limiting example, the force needed may be in the range of 1780 N.

Figure 10A:
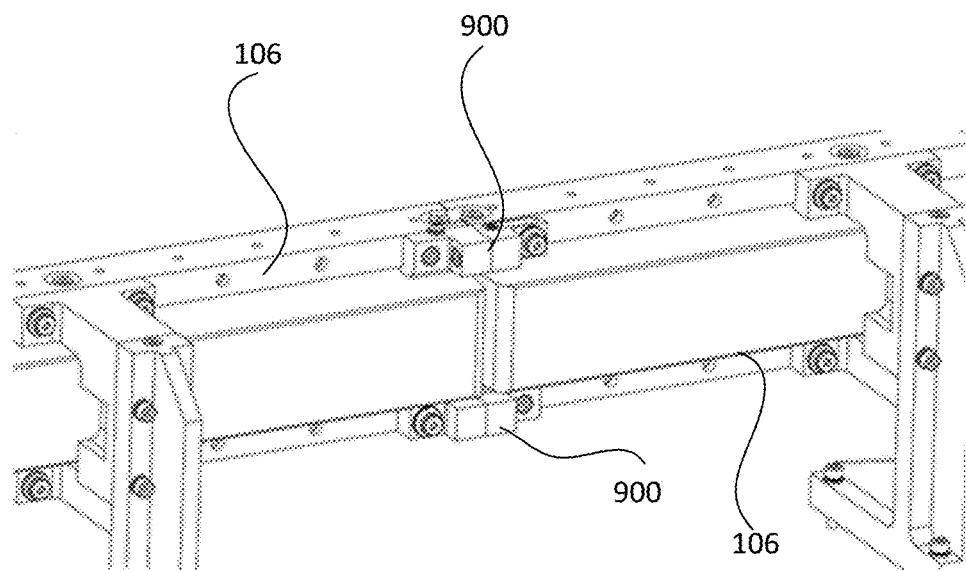
FIG. 10A shows a rear perspective view of two adaptive joint connectors according to an embodiment affixed to upper rails of two track sections and lower rails of two track sections.
Figure 10B:
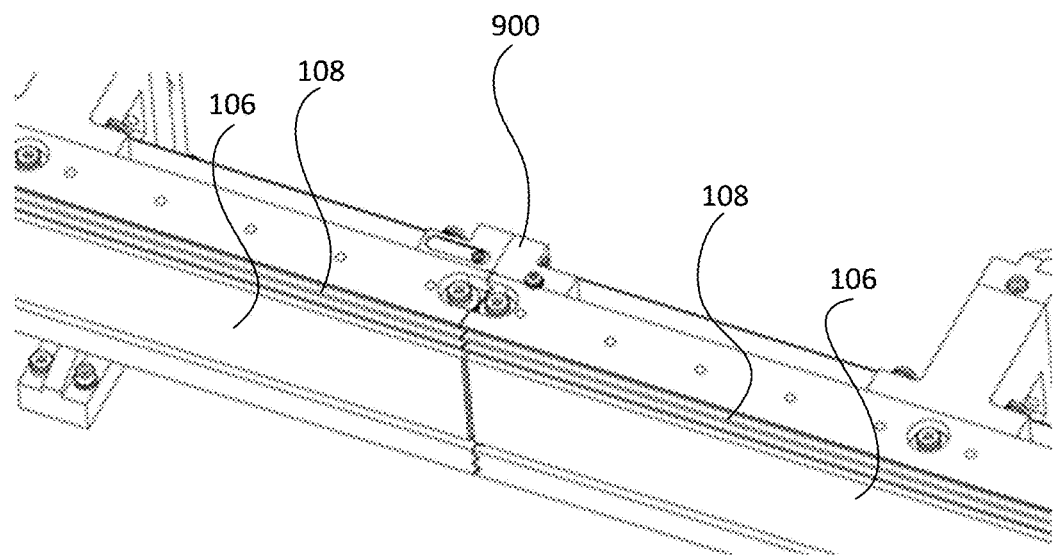
FIG. 10B shows a top front perspective view of an adaptive joint connector according to an embodiment attached to two track sections to hold the guide rails in alignment.

FIG. 10A shows a rear perspective view of two adaptive joint connectors 900 affixed to two upper rail track sections 106 and two lower flat rail track sections 106. As can be seen, the joint connector for the two lower rail sections is rotated, for example to allow easier access to the fasteners. FIG. 10B shows a top front perspective view of an adaptive joint connector 900 attached to two upper rail track sections 106 to hold the guide rails 108 in alignment.

FIGS. 11-17 illustrate a method/procedure to install an adaptive joint connector 900 according to an embodiment herein. In the present embodiment, the adaptive joint connector 900 includes a first bracket 928 and a second bracket 930, however, it will be understood that a similar procedure can be used for any of the various embodiments of joint connectors described herein.

Figure 11:
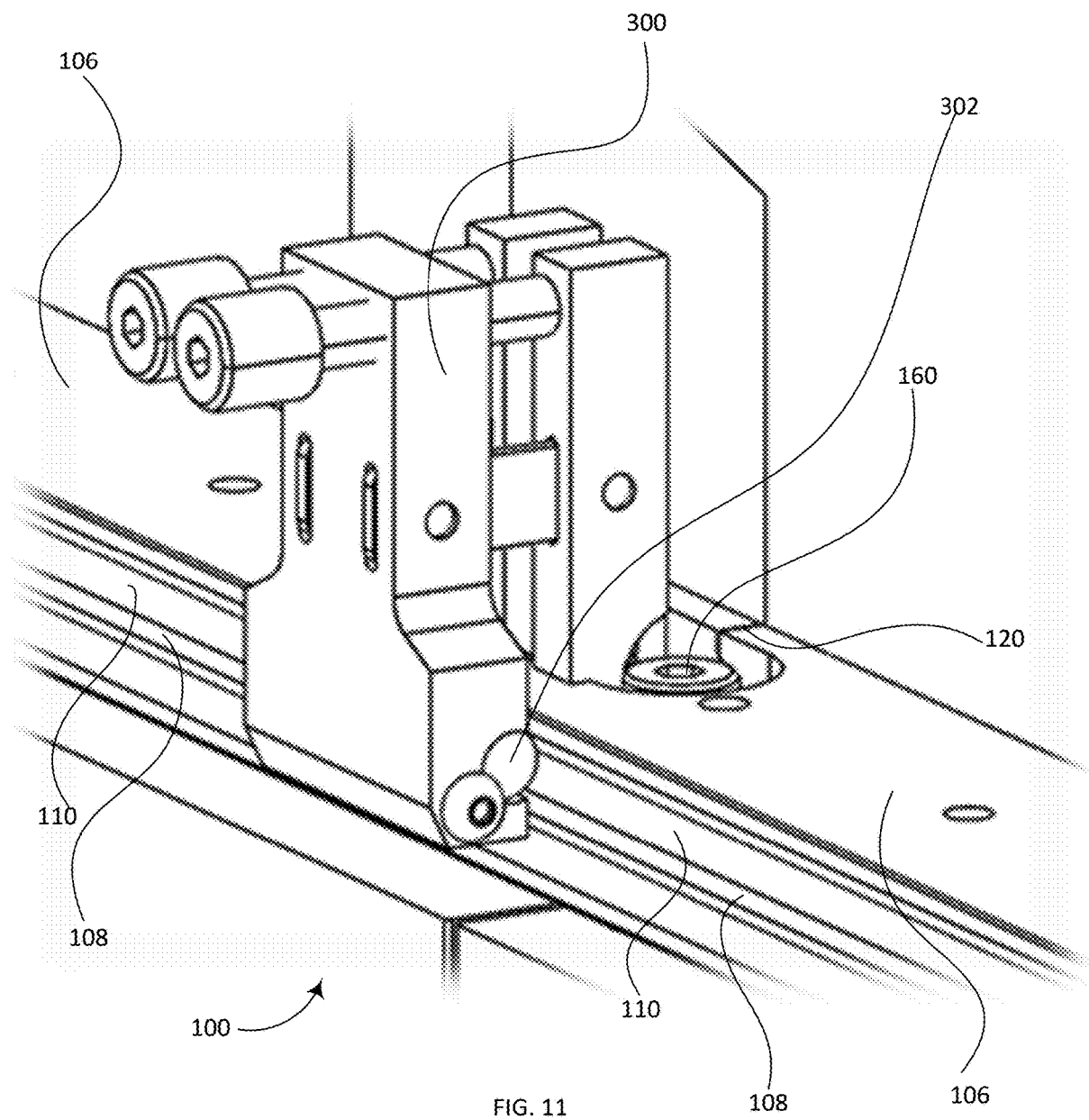
FIG. 11 illustrates setting a clamp to position a dowel in a rail (in this case, a shaped groove) across a joint between track sections.

FIG. 11 illustrates setting a temporary clamp 300 to position a dowel 302 in a shaped groove 110 on a front face of a track. In particular, the dowel is positioned across a joint 120 between a first track section 106 and a second track section 106. In this particular case, the goal is to align a guide rail 108 on each of the first and second track sections and hold the track sections 106 in alignment following connection. The clamp 300 is intended to hold the front face of the first and second track sections, and in particular, the guide rail, in alignment for further processing. In some cases, the clamp may be set with a clamp force of, for example, 1000 N. The clamp 300 and dowel 302 or the like can be selected accordingly as long as the clamp 300 and dowel 302 are able to hold the track sections 106 with the guide rails 108 in alignment to a predetermined alignment tolerance. In this case, the first track section 106 and the second track section 106 are also held against one another by two segment bolts 160 (only one segment bolt 160 is visible in FIG. 11). Once the first and second track sections are clamped, each segment bolt 160 can be lightly tightened.

The phrase "lightly tightened" as used herein refers to tightening a fastener with sufficient force to generally hold the parts to be fastened in place in a way that would be known to one of skill in the art in aligning parts. Parts that are coupled together by a lightly tightened fastener may change position relative to one another in response to a sufficient force. The amount of force necessary to lightly tighten a fastener may vary with the type, size, and position of the fastener, and the nature of the objects fastened by the fastener. The phrase "tightened completely" as used herein refers to tightening a fastener with sufficient force to restrict the movement of the parts fastened by the fastener against stronger forces, such as those that might be present in ordinary operation or the like. Parts that are coupled together by a completely tightened fastener are intended not to change position relative to one another under typical operating forces less than an alignment tolerance. The amount of force necessary to completely tighten a fastener may vary with the type, size, and position of the fastener, and the nature of the objects fastened by the fastener.

Figure 12:
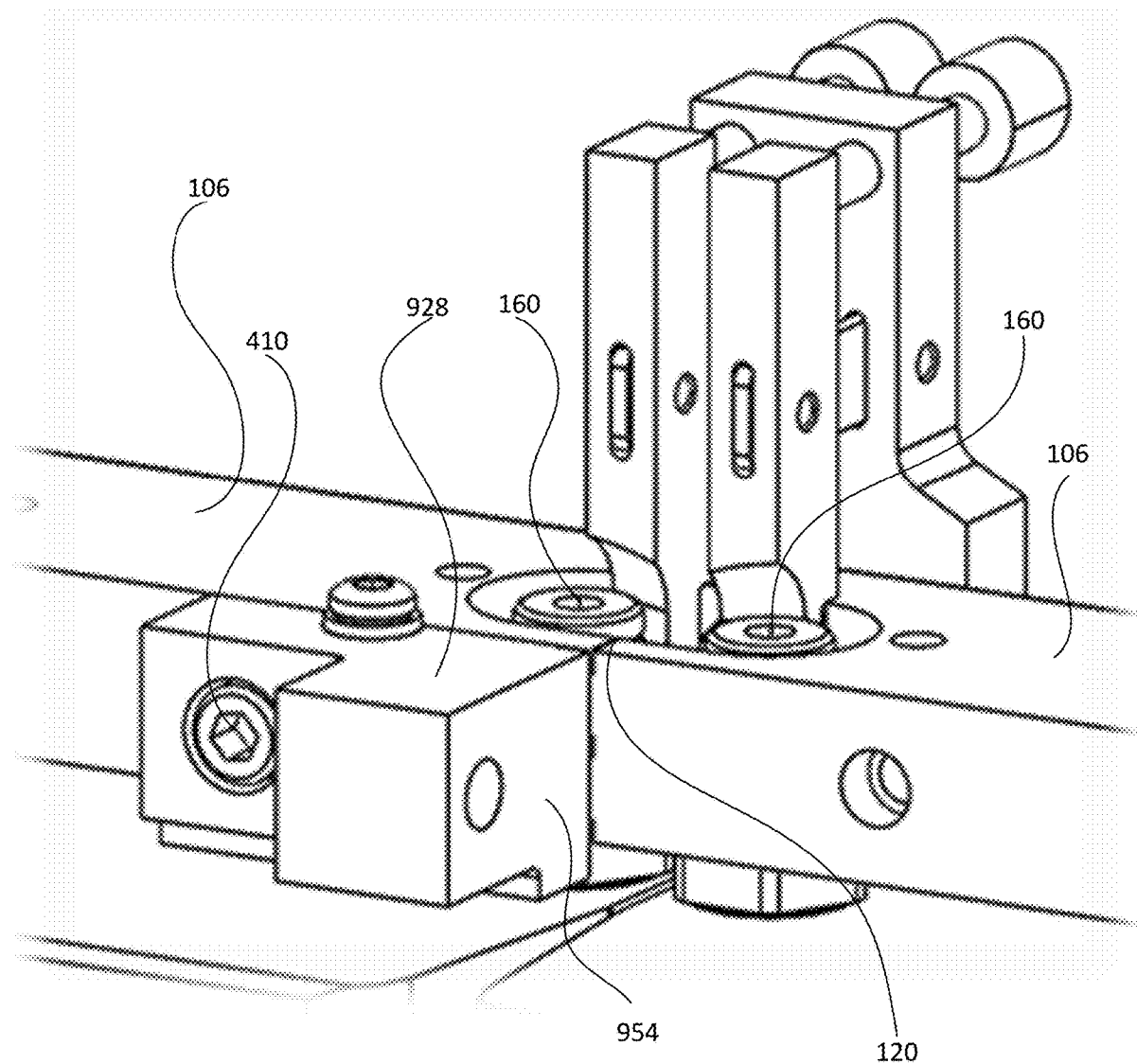
FIG. 12 illustrates placement of a first bracket of a joint connector.

FIG. 12 illustrates the placement of the first bracket 928 of the joint connector 900. The first bracket 928 includes a first edge 954. The first bracket edge 954 is centered on the joint 120. A first fastener (e.g. 8 mm screw and/or a threaded shaft 410) is then lightly tightened to hold the bracket against a portion/feature of the first track section 106 (sometimes called an attachment feature). The first fastener may be lightly tightened with a torque of, for example, 0.5 Nm.

Figure 13A:
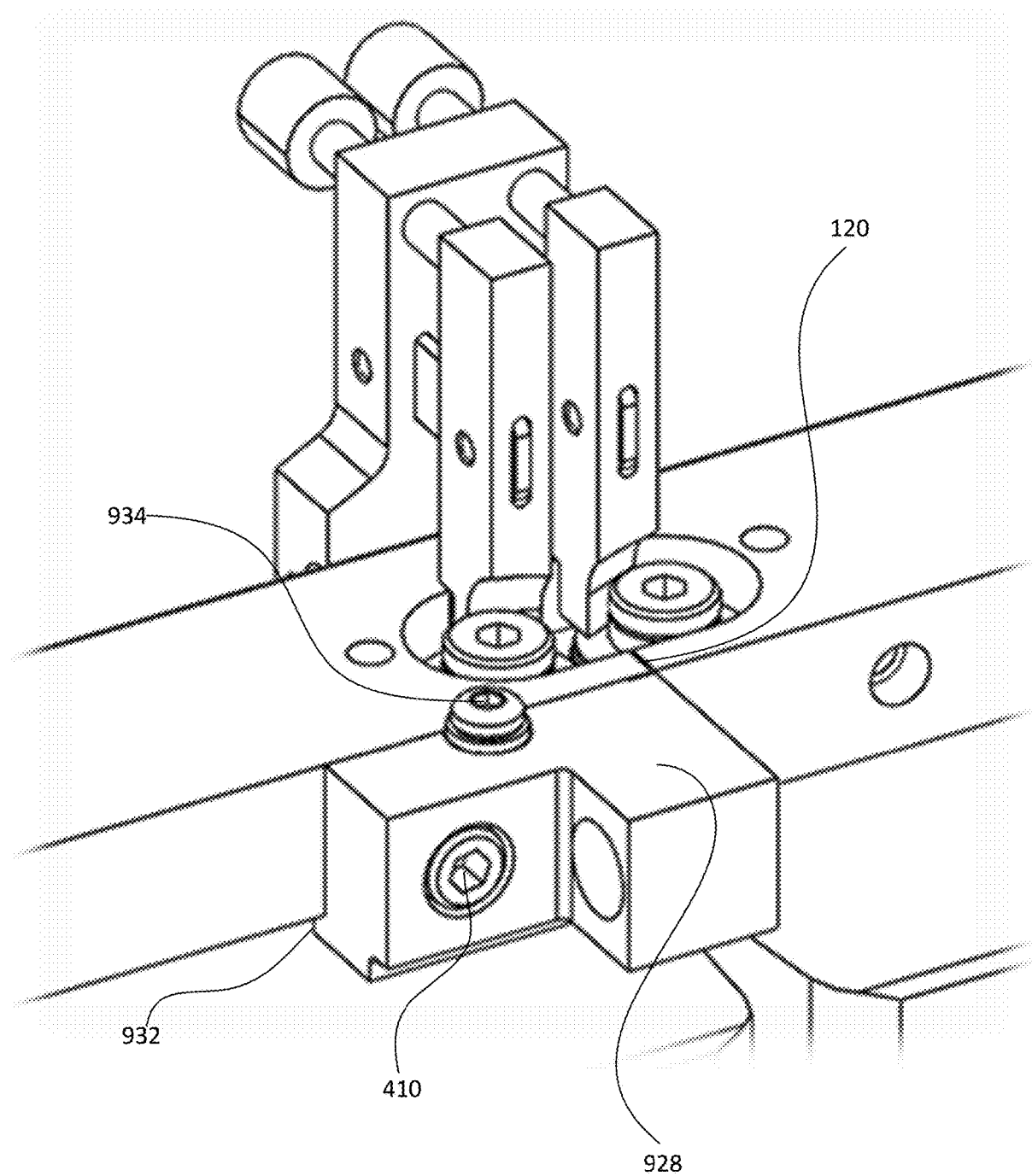
FIG. 13A illustrates tightening a second fastener such that the first bracket is pulled tight against the lower ledge of the rail.

FIG. 13A illustrates completely tightening a second fastener 934 (e.g. 6 mm screw) such that the first bracket 928 is pulled tight against a lower ledge 932 of a portion/feature of the first track section 106 and is biased against the lower ledge 932. The second fastener 934 may be tightened completely with a torque of, for example, 9.0 Nm. In some cases, this second fastener may be a "socket head cap screw" rather than a "button head cap screw" as shown in FIG. 13A. In some other cases, the first track section 106 may include a recess or the like to accommodate the second fastener.

Figure 13B:
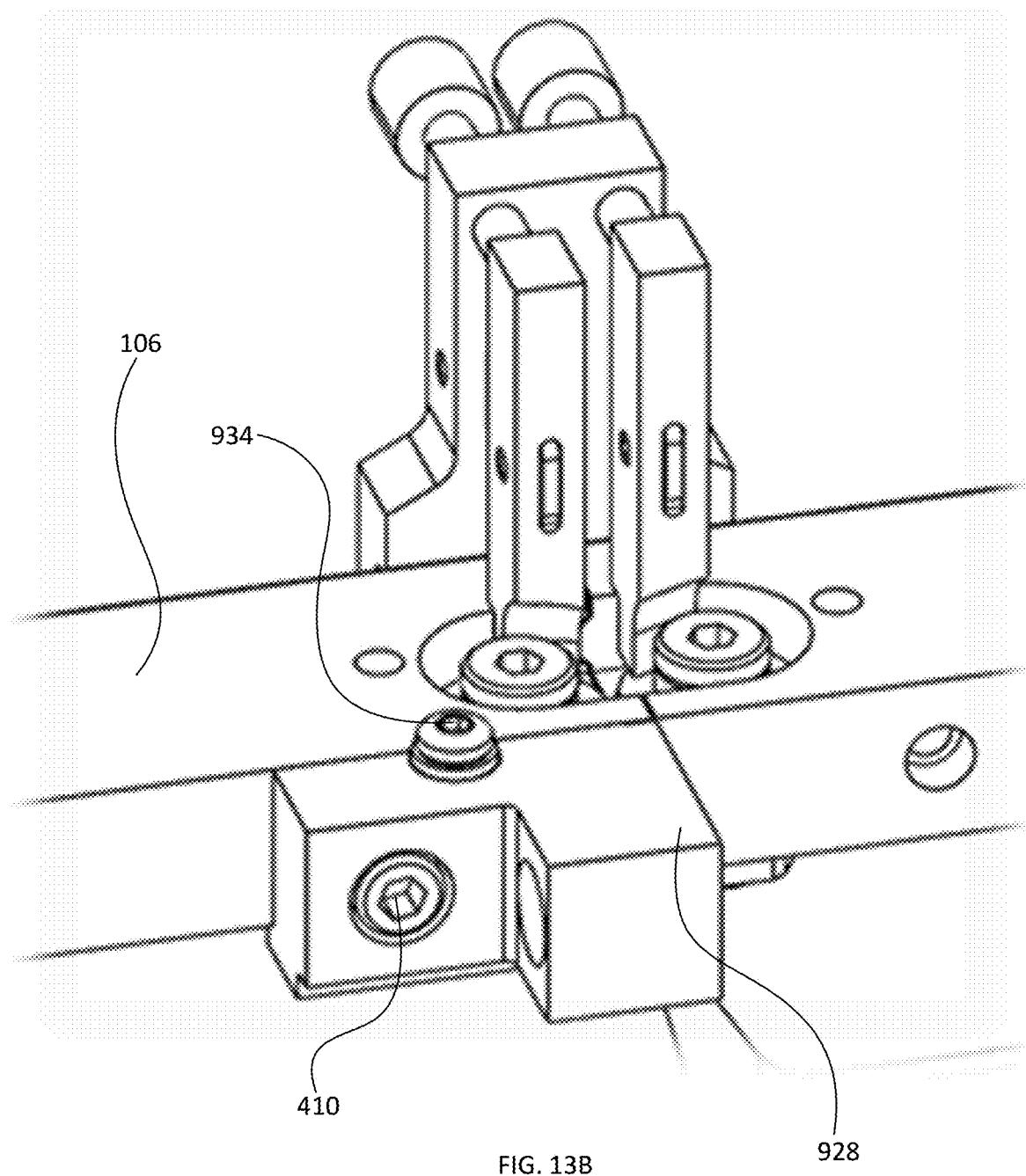
FIG. 13B illustrates tightening a first fastener so that the first bracket is held in place against the track section in all three dimensions.

FIG. 13B illustrates completely tightening the first fastener 410 so that the first bracket 928 is held in place against the first track section 106 in all three dimensions. In the following, the term "screw" or "bolt" may be used but one of skill in the art will understand that other types of fasteners may be used, as appropriate. The first fastener 410 may be tightened completely with a torque of, for example, 40 Nm.

Figure 14:
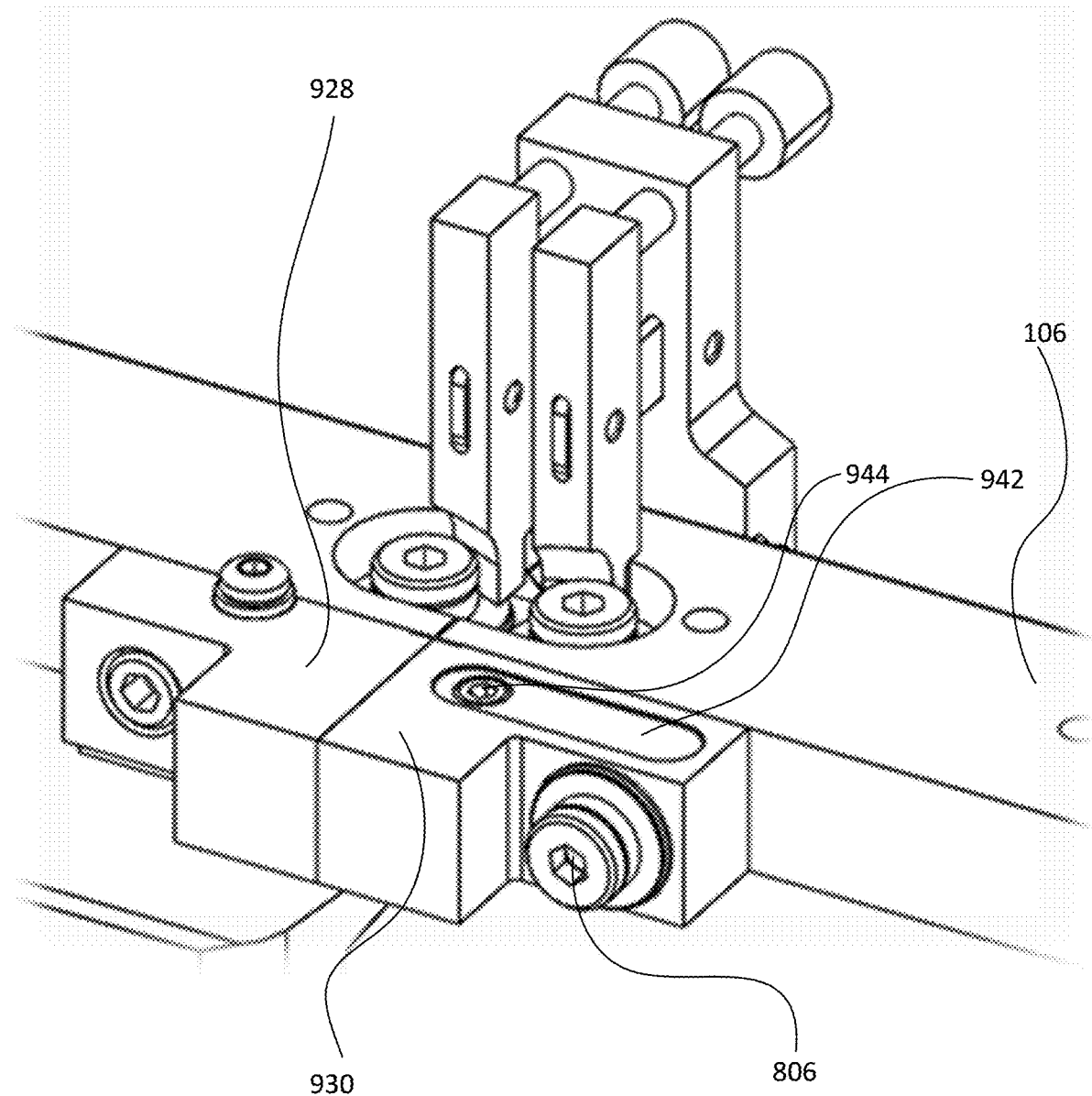
FIG. 14 illustrates placing a second bracket of the joint connector against the second track section and lightly tightening a third screw to hold the second bracket in place.

FIG. 14 illustrates placing the second bracket 930 of the joint connector 900 against the second track section 106, placing the second bracket 930 against the first bracket 928, and lightly tightening a third screw 806 and a fourth screw 944 to hold the second bracket 930 in place. The third screw 806 and the fourth screw 944 may be lightly tightened with a torque of, for example, 0.5 Nm. The second bracket 928 includes a spring clamp 942 coupled to the second bracket 928 via the fourth screw 944. In some cases, the third screw 806 may be a shoulder bolt (e.g. 8 mm shoulder bolt). The third screw 806 may include a spring washer (not shown) to provide sufficient clamping force to hold the second bracket 930 against the second track section 106 while still allowing movement of the second bracket 930 during tightening of a fifth screw 940 as described below.

Figure 15:
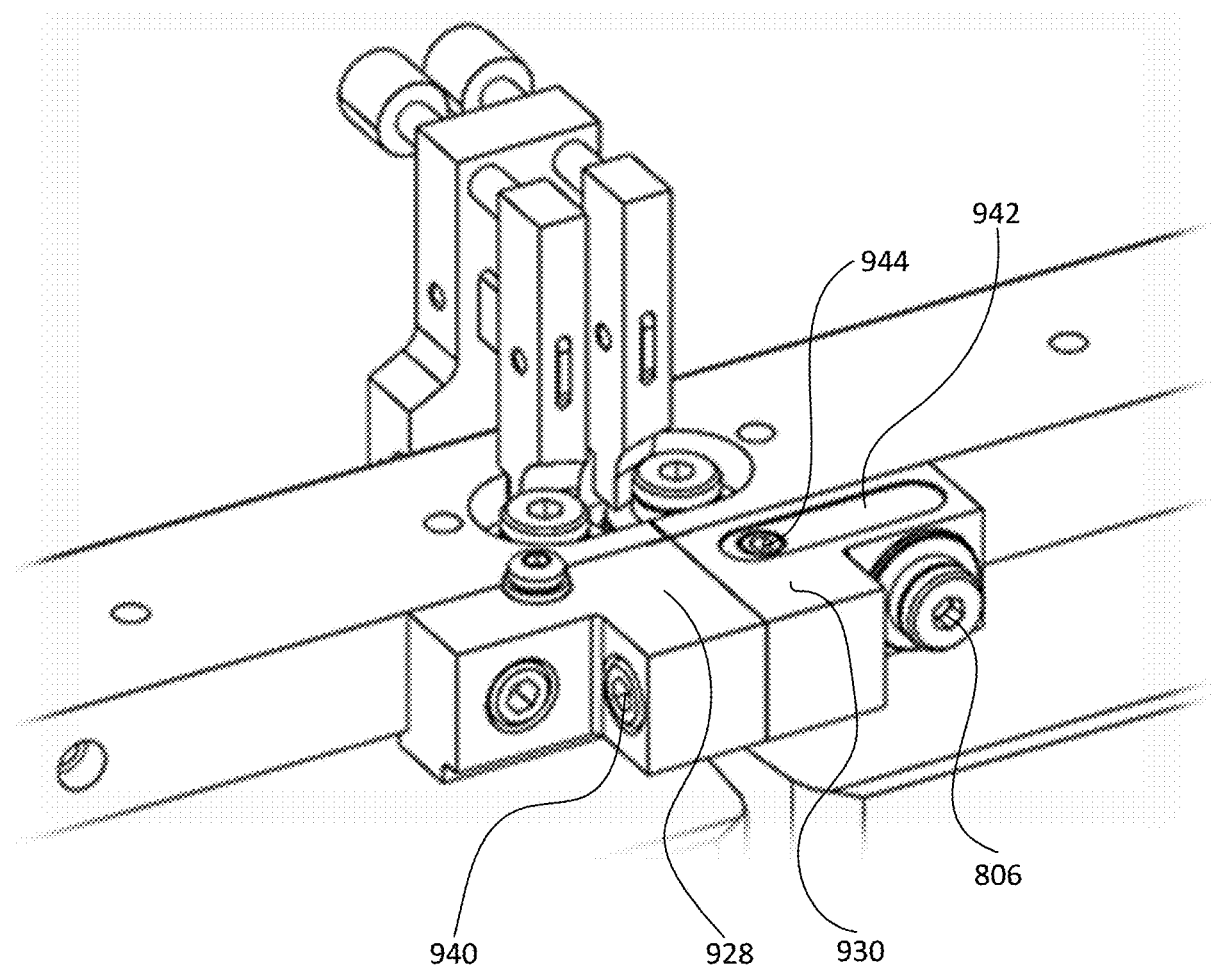
FIG. 15 illustrates tightening a fourth screw to connect the first bracket and the second bracket together.
Figure 16:
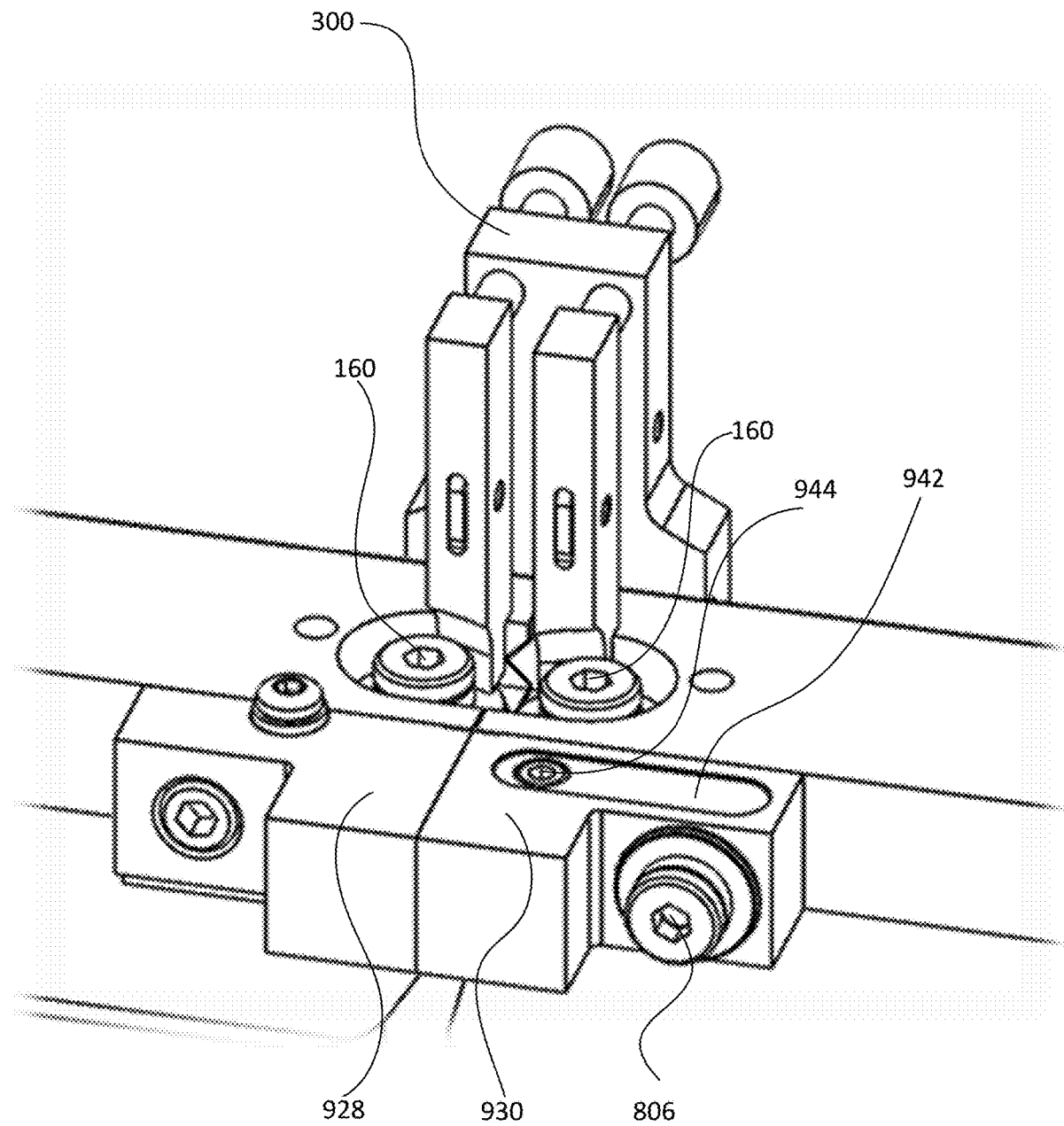
FIG. 16 illustrates tightening the third screw completely.

FIG. 15 illustrates lightly tightening the fifth screw 940 (e.g. 8 mm screw) to bind the first bracket 928 and the second bracket 930 together. The fifth screw 940 may be lightly tightened with a torque of, for example, 10 Nm. FIG. 16 illustrates tightening the third screw 806 and the fourth screw 944 completely and then tightening the fifth screw 940 completely so that the second bracket is held in place against the second track section and the first bracket 930 in all three dimensions. The third screw 806 may be tightened completely with a torque of, for example, 15 Nm. The fourth screw 944 may be tightened completely with a torque of, for example, 9 Nm. The fifth screw 940 may be tightened completely with a torque of, for example, 40 Nm. At this point, it is intended that the alignment of the rails of the track sections should remain within the appropriate alignment tolerance after releasing clamp 300 and/or disengaging dowel 302 from the shaped groove 110. The two segment bolts 160 are then tightened completely.

Figure 17:
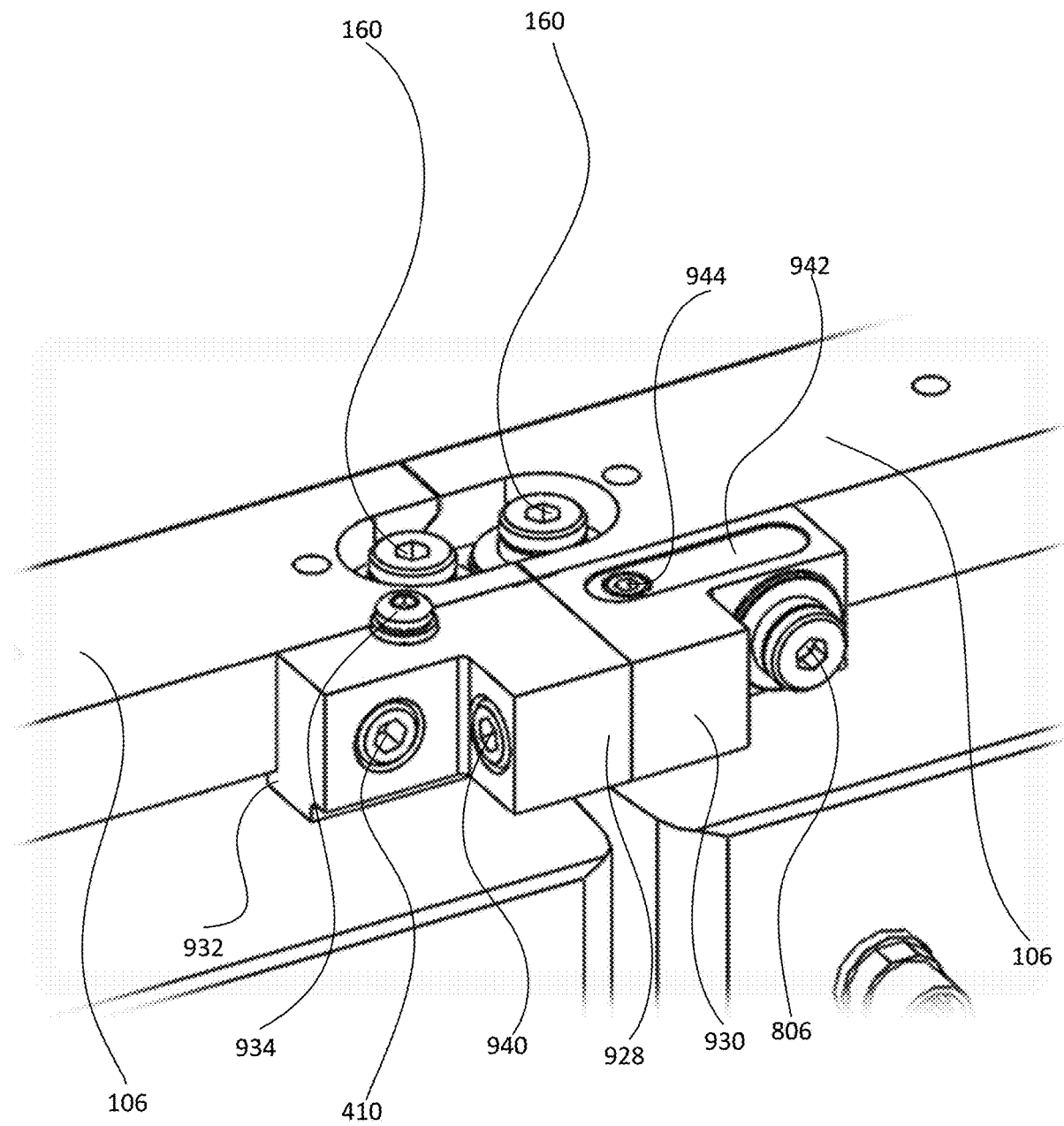
FIG. 17 illustrates two track sections with two segment bolts installed and tightened.

FIG. 17 illustrates two track sections 106 with two segment bolts 160 tightened completely. The first bracket 928 is fastened to one of the track sections 106 by first fastener 410. Visible in FIG. 17 is the lower ledge 932 biased against the lower edge of the track section 106. The first bracket 928 is pulled tight against the lower edge of the first track section 106 by second fastener 934. The second bracket 930 is fastened to the second track section 106 by third screw 806 and to the first bracket 928 by the fifth screw 940. The first bracket 928 is fastened to the second track section 106 via the second bracket 930, the fourth screw 944, the spring clamp 942, and the third screw 806.

Figure 18:
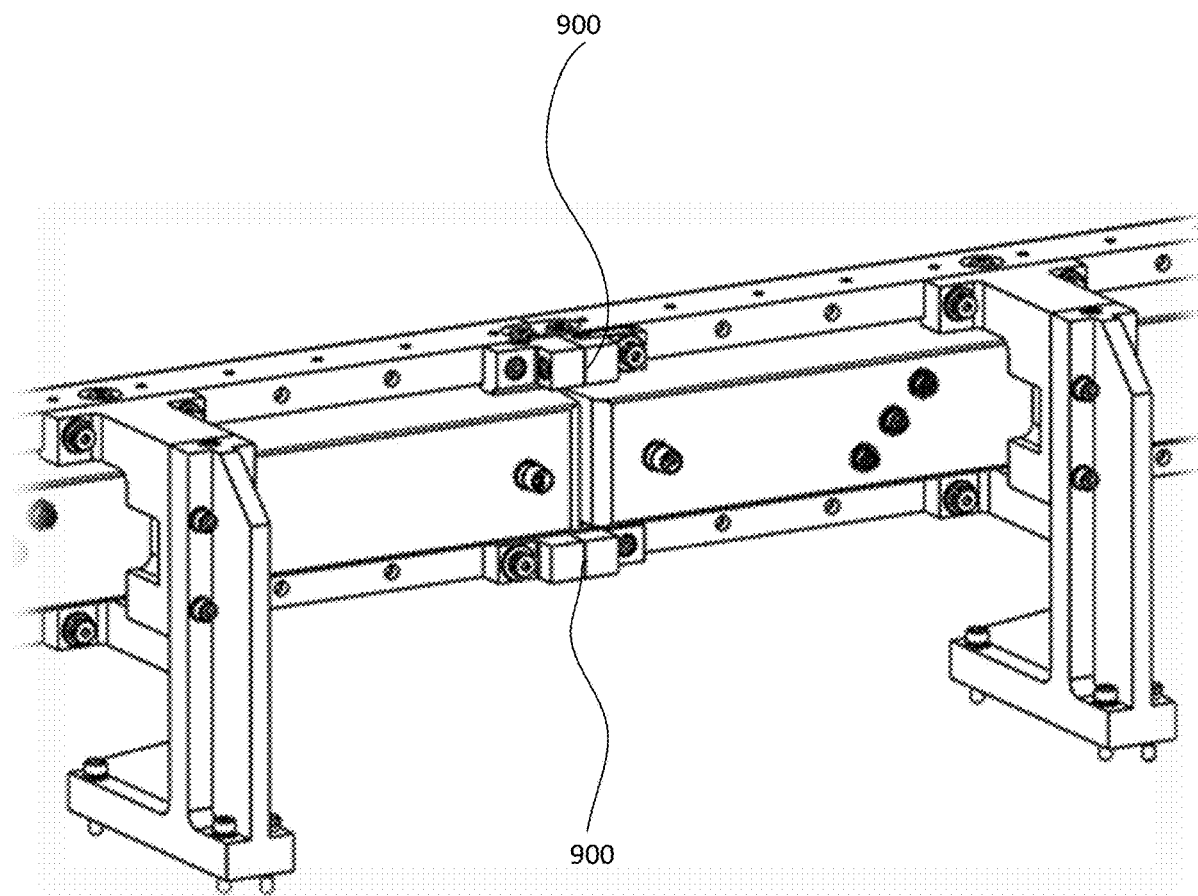
FIG. 18 illustrates an upper and lower pair of rails from two track sections connected by two adaptive joint connectors according to an embodiment.

FIGS. 11 to 17 illustrate a method for installing and securing a joint connector 900 on an upper rail/track section. Similar steps can then be used to secure a joint connector on a lower rail, if present. In this case, the joint connector can be flipped 180 degrees to allow easier access to the various fasteners when connecting the lower rail. FIG. 18 illustrates an upper pair of track sections 106/rails 108 connected by an adaptive joint connector 900 in a first orientation consistent with the steps to secure a joint connector as described above. FIG. 18 also illustrates a lower pair of rails for track sections 106 connected by an adaptive joint connector 900 flipped 180 degrees.

Figure 19:
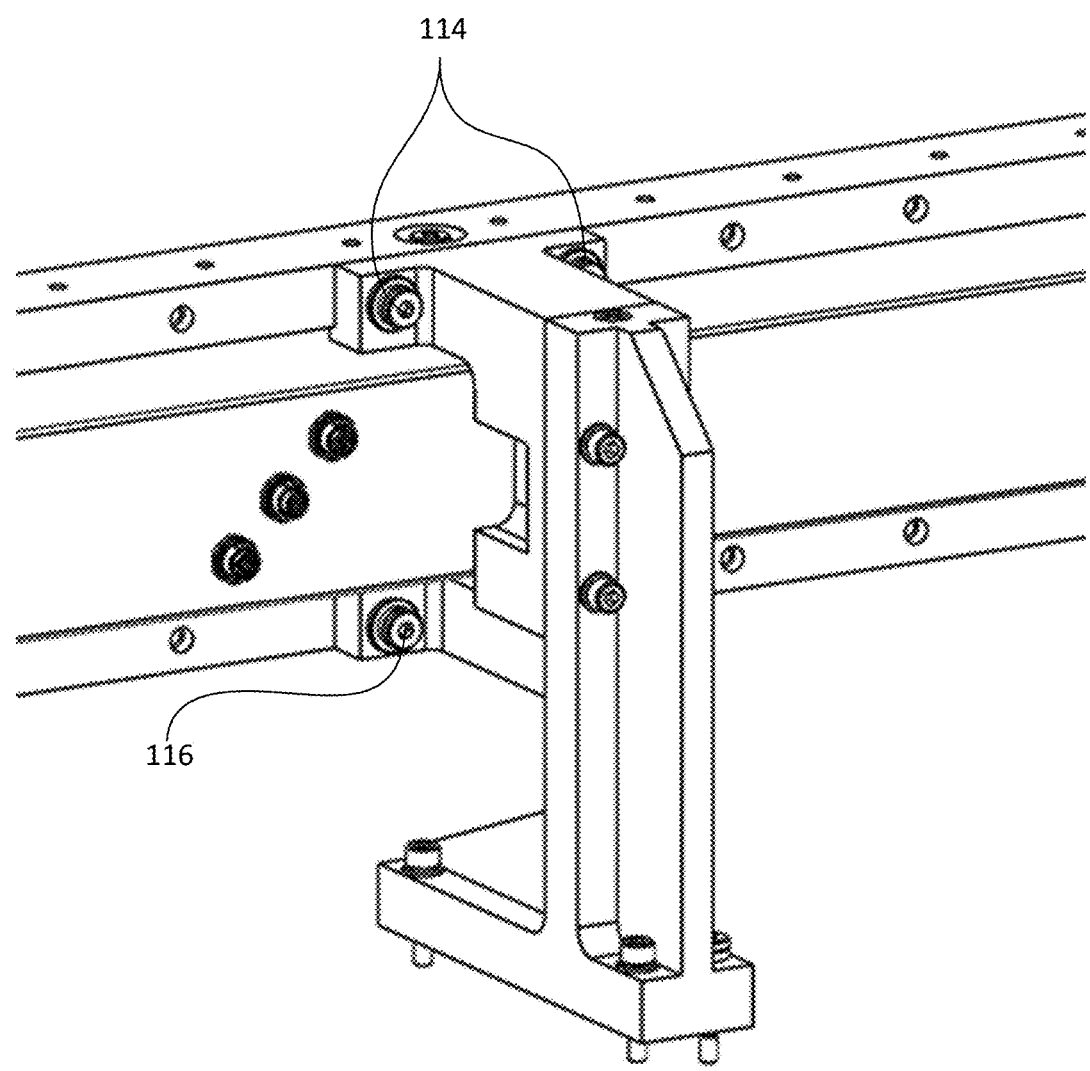
FIG. 19 illustrates tightening of upper and lower stand bolts.

FIG. 19 illustrates tightening two upper stand bolts 114 and two lower stand bolts 116 (second stand bolt 116 not shown), referred to collectively as "stand bolts". The stand bolts are the bolts that hold the stand (support structure for the track) and the upper and lower stand bolts may be lightly tightened when installing the adaptive joint connectors and then tightened completely.

Figure 20:
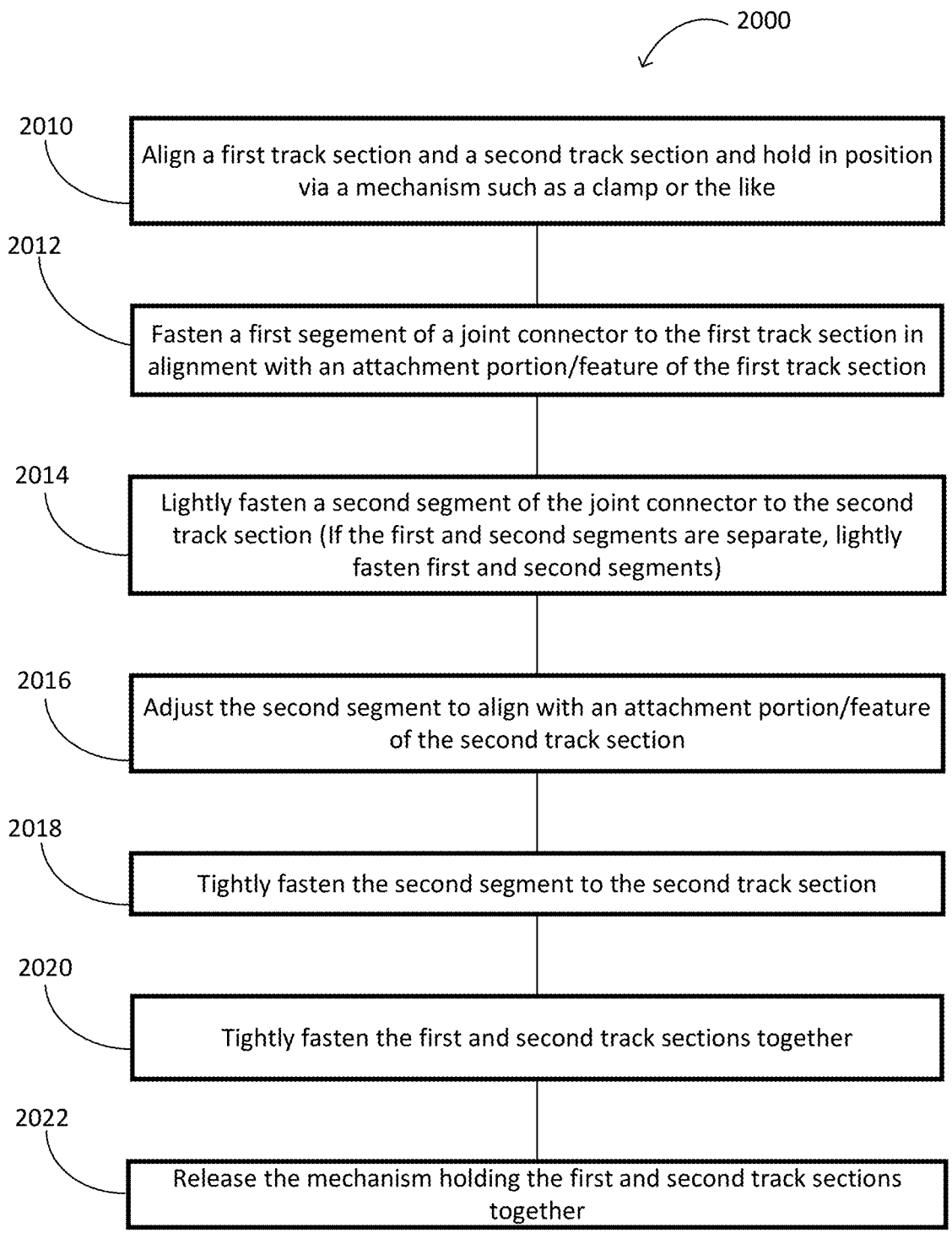
FIG. 20 is a flowchart illustrating a method of joining track sections according to an embodiment.

FIG. 20 is a flow chart for a method 2000 for installing an adaptive joint connector according to an embodiment. At 2010, a first track section and a second track section are brought into and held in a position such that features of the track (typically on a face of the track) are aligned. In a particular example, a dowel may be positioned in a shaped groove across the joint between the first track section and the second track section and clamped to the first track section 106 and the second track section 106 to align and hold the track sections in position.

At 2012, a first segment of a joint connector is tightly fastened to the first track section in alignment with a portion/feature of the first track section (sometimes called an attachment feature). In some cases, more than one fastener may be used in order to secure the first segment in all relevant dimensions.

At 2014, a second segment of the joint connector is lightly fastened to the second track section. If the joint connector has separate segments, the segments will be placed in contact and connected together (lightly fastened) at this point.

At 2016, the second segment is adjusted to be in alignment with a portion/feature of the second track section. As described herein, the second segment may be adjusted in various ways to bring it into alignment with the second track section. It is intended that each of the first and second track sections remain aligned at a face thereof within appropriate alignment tolerances even if the portion/feature of the track sections in contact with the joint connector is not in alignment on each track section due to various differences in tolerances or the like. In some cases, the appropriate alignment tolerance may be in the range of 100 microns or less, 50 microns or less, 40 microns or less, or 25 microns or less.

Once the second segment has been adjusted, at 2018, the second segment is tightly fastened to the second track section. As with the first segment, more than one fastener may be used in order to secure the second segment in all relevant dimensions.

At 2020, the first and second track sections are fastened together and/or to a support stand or the like.

At 2022, the mechanism (for example, the clamp) holding the first and second track sections in alignment is released.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. Further, it will be understood that various elements/aspects of each embodiment described herein may be used with other embodiments as appropriate and that each embodiment may include a sub-set of the elements/aspects described therewith.

The above-described embodiments are intended to be examples only. Alterations, modifications and variations can be effected to the particular embodiments by those of skill in the art without departing from the scope, which is defined solely by the claims appended hereto.

What is claimed is:

1. A joint connector for track sections of a conveyor wherein the track sections comprise a feature that requires alignment, the joint connector comprising:
   a first segment for attachment to an attachment feature of a first track section of the conveyor; and
   a second segment for attachment to an attachment feature of a second track section of the conveyor, wherein the second segment is configured to be adaptive to non-alignment of the attachment features of the first and second track sections in order to maintain alignment of the feature after installation of the joint connector.

2. The joint connector of claim 1 wherein the second segment is configured to be adaptive in order to maintain an alignment tolerance of the feature of 100 microns or less, 50 microns or less, 40 microns or less, or 25 microns or less.

3. The joint connector of claim 1 wherein the second segment is configured to be adaptive in at least one of a vertical direction and a horizontal direction.

4. The joint connector of claim 1 wherein the second segment is configured to be adaptive in three dimensions.

5. The joint connector of claim 1, wherein the second segment is adaptive via a moveable component or a moveable joint or a sliding joint.

6. The joint connector of claim 5, wherein the movable component is moveable by rotating the moveable component.

7. The joint connector of claim 5, wherein the moveable component is moveable by sliding the moveable component through a shaft.

8. The joint connector of claim 1, wherein the second segment comprises a slot through which at least one of a plurality of fasteners passes, the slot to accommodate differences in position of the at least one of the plurality of fasteners.

9. The joint connector of claim 1, wherein the joint connector further comprises a clamp to vertically clamp the second track section, the vertical clamp adjustable in a vertical direction to adapt to a difference in a vertical dimension of the first and second track sections.

10. The joint connector of claim 1, wherein the joint connector further comprises a vertical alignment reference to vertically align the first segment with the attachment feature of the first track section.

11. The joint connector of claim 1, wherein the joint connector further comprises a thermal adaptor for adapting to thermal expansion/contraction of the first and second track sections.

12. A method for connecting track sections of a conveyor, the method comprising:
    securing a first track section and a second track section in an aligned position with a temporary connector;
    connecting a first segment of an adaptive joint connector to the first track section;
    adaptively connecting a second segment of the adaptive joint connector to the second track section to hold the first track section and the second track section in an aligned position; and
    removing the temporary connector.

13. A method according to claim 12, wherein the adaptively connecting comprises adjusting the second segment in one or more of three dimensions.

14. A method according to claim 12, further comprising connecting the first track section and the second track section after the adaptively connecting.

15. A linear motor conveyor system comprising:
    a first track section comprising a first alignment feature;
    a second track section comprising a second alignment feature related to the first alignment feature;
    a joint connector for connecting the first track section with the second track section, the joint connector comprising:
        a first segment for attachment to an attachment feature of the first track section; and
        a second segment for attachment to an attachment feature of the second track section wherein the second segment is configured to be adaptive to non-alignment of the attachment features of the first and second track sections in order to maintain alignment of the first and second alignment features after installation of the joint connector.

* * * * *